(12) United States Patent
Kim et al.

(10) Patent No.: US 10,560,240 B2
(45) Date of Patent: Feb. 11, 2020

(54) METHOD FOR SUPPORTING FLEXIBLE RESOURCE ALLOCATION IN WIRELESS COMMUNICATION SYSTEM, AND DEVICE THEREFOR

(71) Applicant: LG ELECTRONICS INC., Seoul (KR)

(72) Inventors: Jeongki Kim, Seoul (KR); Kiseon Ryu, Seoul (KR); Jinsoo Choi, Seoul (KR); Hangyu Cho, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 42 days.

(21) Appl. No.: 16/062,574

(22) PCT Filed: Dec. 9, 2016

(86) PCT No.: PCT/KR2016/014437
§ 371 (c)(1),
(2) Date: Jun. 14, 2018

(87) PCT Pub. No.: WO2017/105038
PCT Pub. Date: Jun. 22, 2017

(65) Prior Publication Data
US 2018/0375632 A1  Dec. 27, 2018

Related U.S. Application Data

(60) Provisional application No. 62/311,929, filed on Mar. 23, 2016, provisional application No. 62/304,300, (Continued)

(51) Int. Cl.
*H04L 5/00* (2006.01)
*H04W 72/04* (2009.01)
(Continued)

(52) U.S. Cl.
CPC ....... *H04L 5/0053* (2013.01); *H04W 72/0406* (2013.01); *H04W 72/0446* (2013.01); *H04W 84/12* (2013.01); *H04L 1/1614* (2013.01)

(58) Field of Classification Search
None
See application file for complete search history.

(56) References Cited

U.S. PATENT DOCUMENTS 8,804,559 B2 * 8/2014 Liu .............. H04L 1/0026
370/252
2011/0280232 A1  11/2011 Wu et al.
(Continued)

FOREIGN PATENT DOCUMENTS

EP        3200381       8/2017
WO     2012012567       1/2012
(Continued)

OTHER PUBLICATIONS

European Patent Office Application Serial No. 16875980.1, Search Report dated Jun. 26, 2019, 8 pages.
(Continued)

*Primary Examiner* — Hong S Cho
(74) *Attorney, Agent, or Firm* — Lee, Hong, Degerman, Kang & Waimey

(57) ABSTRACT

Disclosed is a method by which an operating station (STA) transmits a signal in a multiple user (MU) scheme in a wireless LAN (WLAN) system. In the present method, the STA configures a wireless frame, which includes a data field for data transmission and a signaling (SIG) field including control information, wherein the SIG field includes a SIG A field, which includes bandwidth information indicating the whole bandwidth having a bandwidth of $2^n$ times that of 20 MHz, and a SIG B field, which includes user specific information. Here, the bandwidth information of the SIG A field additionally indicates whether the whole bandwidth includes one or more 20 MHz bands (null channel), which are not used in the data transmission.

15 Claims, 16 Drawing Sheets

Related U.S. Application Data filed on Mar. 6, 2016, provisional application No. 62/303,404, filed on Mar. 4, 2016, provisional application No. 62/267,916, filed on Dec. 16, 2015.

(51) Int. Cl.
*H04W 84/12* (2009.01)
*H04L 1/16* (2006.01)

(56) References Cited

U.S. PATENT DOCUMENTS

| | | |
|---|---|---|
| 2012/0287915 A1 | 11/2012 | Cheong et al. |
| 2015/0139119 A1* | 5/2015 | Azizi ................ H04W 72/1278 370/329 |
| 2015/0215818 A1* | 7/2015 | Suh .................... H04L 27/2613 370/330 |

FOREIGN PATENT DOCUMENTS

| | | |
|---|---|---|
| WO | 2015068968 | 5/2015 |
| WO | 2015119360 | 8/2015 |
| WO | 2017003229 | 1/2017 |

OTHER PUBLICATIONS

PCT International Application No. PCT/KR2016/014437, Written Opinion of the International Searching Authority dated Mar. 17, 2017, 14 pages.

Kwon, Young Hoon et al., "SIG Field Design Principle for 11 ax", doc.: IEEE 802.11-15/0344r2, Mar. 2015, 19 pages.

\* cited by examiner

| Composite Name: | BW | Reserved | STBC | Group ID | NSTS/Partial AID ||||  TXOP_PS_NOT_ALLOWED | Reserved |
|---|---|---|---|---|---|---|---|---|---|---|
| SU Name: | BW | Reserved | STBC | Group ID | SU NSTS | Partial AID ||| TXOP_PS_NOT_ALLOWED | Reserved |
| MU Name: | BW | Reserved | STBC | Group ID | MU[0] NSTS | MU[1] NSTS | MU[2] NSTS | MU[3] NSTS | TXOP_PS_NOT_ALLOWED | Reserved |
| Bits: | 2 | 1 | 1 | 6 | 3 | 3 | 3 | 3 | 1 | 1 |

Bit positions: B0 B1 B2 B3 B4 B9 B10 B12 B13 B15 B16 B18 B19 B21 B22 B23

(b)

| Composite Name: | Short GI | Short GI NSYM Disambiguation | SU/MU[0] Coding | LDPC Extra OFDM symbol | SU VHT-MCS/MU[1-3] Coding |||| Beam-formed | Reserved | CRC | Tail |
|---|---|---|---|---|---|---|---|---|---|---|---|---|
| SU Name: | Short GI | Short GI NSYM Disambiguation | SU/MU[0] Coding | LDPC Extra OFDM symbol | SU VHT-MCS |||| Beam-formed | Reserved | CRC | Tail |
| MU Name: | Short GI | Short GI NSYM Disambiguation | SU/MU[0] Coding | LDPC Extra OFDM symbol | MU[1] Coding | MU[2] Coding | MU[3] Coding | Reserved | Reserved | Reserved | CRC | Tail |
| Bits: | 1 | 1 | 1 | 1 | 1 | 1 | 1 | 1 | 1 | 1 | 8 | 6 |

Bit positions: B0 B1 B2 B3 B4 B5 B6 B7 B8 B9 B10 B17 B18 B23

| L-STF | L-LTF | L-SIG | HE-SIGA | HE-STF | HE-LTF | HE-SIGB | Data |
|---|---|---|---|---|---|---|---|

(b)

| L-STF | L-LTF | L-SIG | HE-SIGA | HE-SIGB | HE-STF | HE-LTF | Data |
|---|---|---|---|---|---|---|---|
| L-STF | L-LTF | L-SIG | HE-SIGA | HE-SIGB | HE-STF | HE-LTF | Data |
| L-STF | L-LTF | L-SIG | HE-SIGA | HE-SIGB | HE-STF | HE-LTF | Data |
| L-STF | L-LTF | L-SIG | HE-SIGA | HE-SIGB | HE-STF | HE-LTF | Data |

← Channel →

Duplicated  Encoding over full BW

FIG. 12
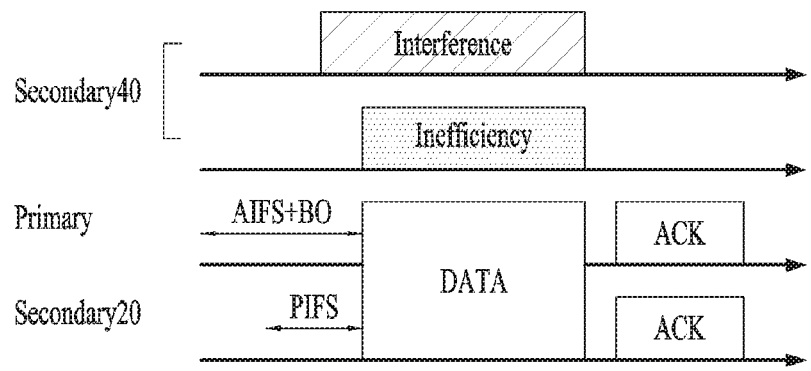
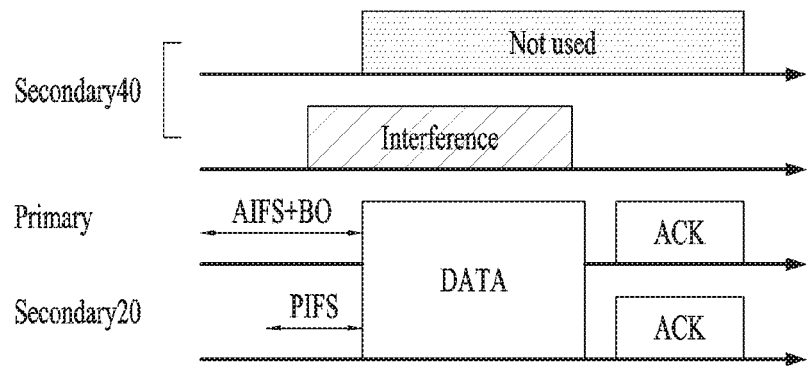
FIG. 13
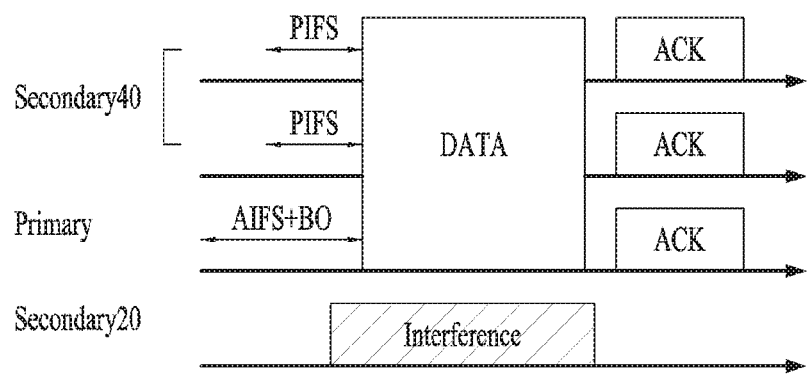

METHOD FOR SUPPORTING FLEXIBLE RESOURCE ALLOCATION IN WIRELESS COMMUNICATION SYSTEM, AND DEVICE THEREFOR

CROSS-REFERENCE TO RELATED APPLICATIONS

This application is the National Stage filing under 35 U.S.C. 371 of International Application No. PCT/KR2016/014437, filed on Dec. 9, 2016, which claims the benefit of U.S. Provisional Application Nos. 62/267,916, filed on Dec. 16, 2015, 62/303,404, filed on Mar. 4, 2016, 62/304,300, filed on Mar. 6, 2016, and 62/311,929, filed on Mar. 23, 2016, the contents of which are all hereby incorporated by reference herein in their entirety.

TECHNICAL FIELD

The present disclosure relates to a wireless communication system, and more particularly, to a method and apparatus for enabling efficient data transmission on a non-contiguous channel or a channel having a bandwidth that is not supported by a legacy system in a wireless local area network (WLAN) system.

BACKGROUND ART

While the proposed method is applicable to various types of wireless communication, a WLAN system will be described as an exemplary system to which the present disclosure is applicable.

WLAN Standards have been developed as institute of electrical and electronics engineers (IEEE) 802.11. IEEE 802.11a and b use an unlicensed band at 2.4 GHz or 5 GHz. IEEE 802.11b provides a transmission rate of 11 Mbps and IEEE 802.11a provides a transmission rate of 54 Mbps. IEEE 802.11g provides a transmission rate of 54 Mbps by applying orthogonal frequency division multiplexing (OFDM) at 2.4 GHz. IEEE 802.11n provides a transmission rate of 300 Mbps for four spatial streams by applying Multiple Input Multiple Output (MIMO)-OFDM. IEEE 802.11n supports a channel bandwidth of up to 40 MHz and, in this case, provides a transmission rate of 600 Mbps.

The above-described WLAN standards have evolved into IEEE 802.11ac that uses a bandwidth of up to 160 MHz and supports a transmission rate of up to 1 Gbits/s for 8 spatial streams and IEEE 802.11ax standards are under discussion.

DISCLOSURE OF THE INVENTION

Technical Task

An object of the present disclosure is to provide a method and apparatus for efficiently transmitting a signal by a station (STA) in a wireless communication system.

Specifically, the present disclosure is intended to efficiently define a resource allocation scheme for orthogonal frequency division multiple access (OFDMA) or multi-user multiple input multiple output (MU-MIMO) in a future-generation WLAN system conforming to institute of electrical and electronics engineers (IEEE) 802.11ax among wireless communication systems.

It will be appreciated by persons skilled in the art that the objects that could be achieved with the present disclosure are not limited to what has been particularly described hereinabove and the above and other objects that the present disclosure could achieve will be more clearly understood from the following detailed description.

Technical Solution

To achieve these and other advantages and in accordance with the purpose of the present invention, as embodied and broadly described, according to one embodiment, a method of transmitting a signal, which is transmitted by an STA (station) operating in a wireless LAN (WLAN) system using a multi user (MU) scheme, includes the steps of configuring a radio frame in which a signaling (SIG) field including control information and a data field for transmitting data are included, wherein the signaling field is configured to include an SIG A field including bandwidth information indicating the whole bandwidth having a bandwidth wider than 20 MHz as much as $2^n$ times and an SIG B field including user specific information, and transmitting the radio frame to one or more other STAs. In this case, the bandwidth information of the SIG A field additionally indicates whether or not the whole bandwidth contains one or more 20 MHz bands (null channel) not used for transmitting data.

The SIG B field can additionally include information indicating a location of the null channel.

Preferably, the SIG B field can include a common part including common control information and a user specific part including the user specific information and the information indicating the location of the null channel can be included in the common part.

The bandwidth information of the SIG A field may have a form of a bit sequence of a prescribed length, first region values of the bit sequence indicate that the whole bandwidth having a bandwidth wider than 20 MHz as much as $2^n$ times is used for transmitting data without the null channel, and second region values of the bit sequence can indicate that the whole bandwidth having the bandwidth wider than 20 MHz as much as $2^n$ times includes the one or more null channels.

The first region values of the bit sequence includes 1, 2, 3, and 4 and 1, 2, 3, and 4 of the bit sequence can indicate 20 MHz, 40 MHz, 80 MHz, and 160 MHz, respectively.

If the radio frame is transmitted on a bandwidth of 80 MHz, the SIG B field can be transmitted via first to fourth channels each of which corresponds to a band of 20 MHz and SIG B field control information, which is transmitted via the first channel and the second channel, makes a pair with the third channel and the fourth channel and can be repeatedly transmitted via each of the pairs.

If the bandwidth information of the SIG A field indicates that the null channel is included in the whole bandwidth of 80 MHz, SIG B field control information, which is transmitted via a channel rather than the null channel among two channels making a pair, can indicate a location of the null channel.

Information indicating the location of the null channel among the SIG B field control information can indicate that 242 tones corresponding to a specific channel correspond to an empty resource region.

If the radio frame is transmitted on a bandwidth of 160 MHz, the SIG B field is transmitted via first to eighth channels each of which corresponds to a band of 20 MHz, SIG B field control information, which is transmitted via the first channel, makes a first pair with the third channel, the fifth channel, and the seventh channel and is repeatedly transmitted via each of the channels, and SIG B field control information, which is transmitted via the second channel, makes a second pair with the fourth channel, the sixth channel, and the eighth channel and can be repeatedly transmitted via each of the channels.

If the bandwidth information of the SIG A field indicates that the null channel is included in the whole bandwidth of 160 MHz, SIG B field control information, which is transmitted via a channel rather than the null channel of a pair including the null channel among the first pair and the second pair, can indicate a location of the null channel.

Information indicating the location of the null channel among the SIG B field control information can indicate that 242 tones corresponding to a specific channel correspond to an empty resource region.

If the whole bandwidth is equal to or wider than 80 MHz, the whole bandwidth can include a primary 20 MHz channel, a secondary 20 MHz channel, and a secondary 40 MHz channel and the primary 20 MHz channel may not be configured as the null channel.

To further achieve these and other advantages and in accordance with the purpose of the present invention, according to a different embodiment, a method of receiving a signal, which is received by an STA (station) operating in a wireless LAN (WLAN) system using a multi user (MU) scheme, includes the steps of receiving a radio frame in which a signaling (SIG) field including control information and a data field for transmitting data are included, and processing the received radio frame. In this case, the signaling field includes an SIG A field including bandwidth information indicating the whole bandwidth having a bandwidth wider than 20 MHz as much as $2^n$ times and an SIG B field including user specific information and the bandwidth information of the SIG A field can check whether or not the whole bandwidth includes one or more 20 MHz bands (null channel) not used for transmitting data.

To further achieve these and other advantages and in accordance with the purpose of the present invention, according to a further different embodiment, an STA (station) capable of operating in a wireless LAN (WLAN) system using a multi user (MU) scheme includes a processor configured to configure a radio frame in which a signaling (SIG) field including control information and a data field for transmitting data are included, wherein the signaling field is configured to include an SIG A field including bandwidth information indicating the whole bandwidth having a bandwidth wider than 20 MHz as much as $2^n$ times and an SIG B field including user specific information, and a transceiver configured to receive a radio frame from the processor and transmit the radio frame to one or more other STAs. In this case, the processor is configured to make the bandwidth information of the SIG A field additionally indicate whether or not the whole bandwidth includes one or more 20 MHz bands (null channel) not used for transmitting data.

To further achieve these and other advantages and in accordance with the purpose of the present invention, according to a further different embodiment, an STA (station) capable of operating in a wireless LAN (WLAN) system using a multi user (MU) scheme includes a transceiver configured to receive a radio frame in which a signaling (SIG) field including control information and a data field for transmitting data are included, and a processor configured to process the radio frame received by the transceiver. In this case, the signaling field includes an SIG A field including bandwidth information indicating the whole bandwidth having a bandwidth wider than 20 MHz as much as $2^n$ times and an SIG B field including user specific information and the processor is configured to check whether or not the whole bandwidth includes one or more 20 MHz bands (null channel) not used for transmitting data via the bandwidth information of the SIG A field.

Advantageous Effects

According to the present disclosure, a station (STA) can efficiently transmit a signal in a wireless communication system. Specifically, a resource allocation scheme can be performed efficiently for orthogonal frequency division multiple access (OFDMA) or multi-user multiple input multiple output (MU-MIMO) in a future-generation wireless local area network (WLAN) system conforming to institute of electrical and electronics engineers (IEEE) 802.11ax among wireless communication systems.

It will be appreciated by persons skilled in the art that the effects that could be achieved with the present disclosure are not limited to what has been particularly described hereinabove and the above and other effects that the present disclosure could achieve will be more clearly understood from the following detailed description.

DESCRIPTION OF DRAWINGS

FIGS. 4 to 8 are views illustrating exemplary frame structures in an institute of electrical and electronics engineers (IEEE) 802.11 system.

FIG. 9 is a view illustrating exemplary physical layer protocol data unit (PPDU) formats that may be used in the present disclosure.

FIGS. 11 and 12 are views illustrating inefficiency of a legacy channel allocation scheme.

FIGS. 13 and 14 are views illustrating the concept of supporting a non-contiguous channel or a 60× MHz channel according to an embodiment of the present disclosure.

BEST MODE

Mode for Invention

Figure 1:
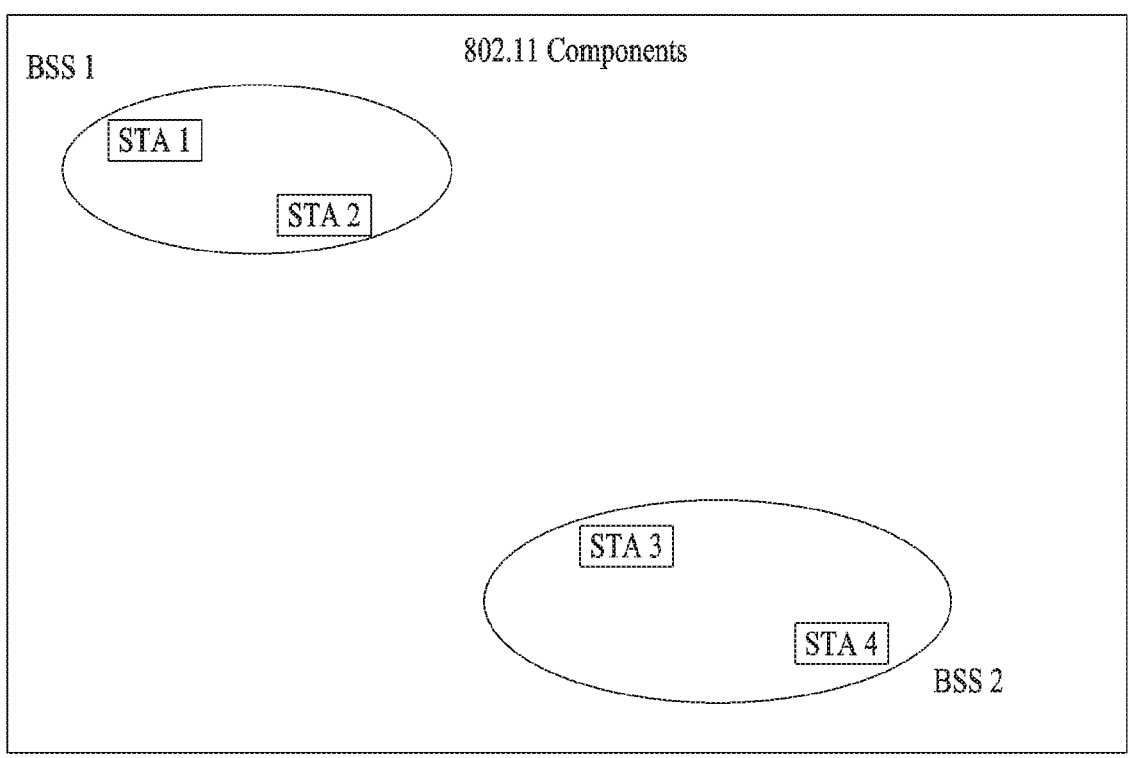
FIG. 1 is a view illustrating an exemplary configuration of a Wireless Local Area Network (WLAN) system.

The invention now will be described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art.

Embodiments described hereinbelow are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment.

Specific terms used in the embodiments of the present invention are provided to aid in understanding of the present invention. These specific terms may be replaced with other terms within the scope and spirit of the present invention.

In some cases, to prevent the concept of the present invention from being obscured, structures and apparatuses of the known art will be omitted, or will be shown in the form of a block diagram based on main functions of each structure and apparatus. In addition, wherever possible, the same reference numbers will be used throughout the drawings and the specification to refer to the same or like parts.

The embodiments of the present invention can be supported by standard documents disclosed for at least one of wireless access systems, Institute of Electrical and Electronics Engineers (IEEE) 802, 3rd Generation Partnership Project (3GPP), 3GPP Long Term Evolution (3GPP LTE), LTE-Advanced (LTE-A), and 3GPP2. Steps or parts that are not described to clarify the technical features of the present invention can be supported by those documents. Further, all terms as set forth herein can be explained by the standard documents.

In the present disclosure, a terminology, each of which includes such an ordinal number as 1st, 2nd and the like, may be used to describe various components. In doing so, the various components should be non-limited by the corresponding terminologies, respectively. The terminologies are only used for the purpose of discriminating one component from other components. For example, a first configuration element can be referred to as a second configuration element, similarly, the second configuration element can be referred to as the first configuration element while not being deviated from the scope of right according to the concept of the present specification.

In the present application, such a terminology as 'comprise', 'include' and the like should be construed not as excluding existence of a different configuration element but as designating further existence of a different configuration element. In this disclosure, such a terminology as ' . . . unit', ' . . . part' corresponds to a unit for processing at least one or more functions or operations. The unit can be implemented by a combination of hardware and/or software.

FIG. 1 is a view illustrating an exemplary configuration of a Wireless Local Area Network (WLAN) system.

As depicted in FIG. 1, a wireless local area network includes at least one Basic Service Set (BSS). The BSS is a set of Stations (STA) capable of communicating with each other by successfully performing synchronization.

The STA is a logical entity including a physical layer interface for a Medium Access Control (MAC) and wireless media. The STA includes an Access Point (AP) and a Non-AP STA. A mobile terminal operated by a user corresponds to the Non-AP STA among the STAs. If it is simply called an STA, the STA may correspond to the Non-AP STA. The Non-AP STA can be called such a different name as a terminal, a Wireless Transmit/Receive Unit (WTRU), User Equipment (UE), a Mobile Station (MS), a Mobile Terminal, a Mobile Subscriber Unit, or the like.

And, the AP is an entity providing an STA associated to the AP with an access to a Distribution System (DS) via the wireless media. The AP can be called a concentrated controller, a Base Station (BS), a Node-B, a Base Transceiver System (BTS), a site controller, or the like.

The BSS can be divided into an infrastructure BSS and an Independent BSS (IBSS).

The BSS depicted in FIG. 1 corresponds to the IBSS. The IBSS means the BSS not including an AP. Since the IBSS does not include the AP, an access to the DS is not permitted to the IBSS. Thus, the IBSS forms a self-contained network.

Figure 2:
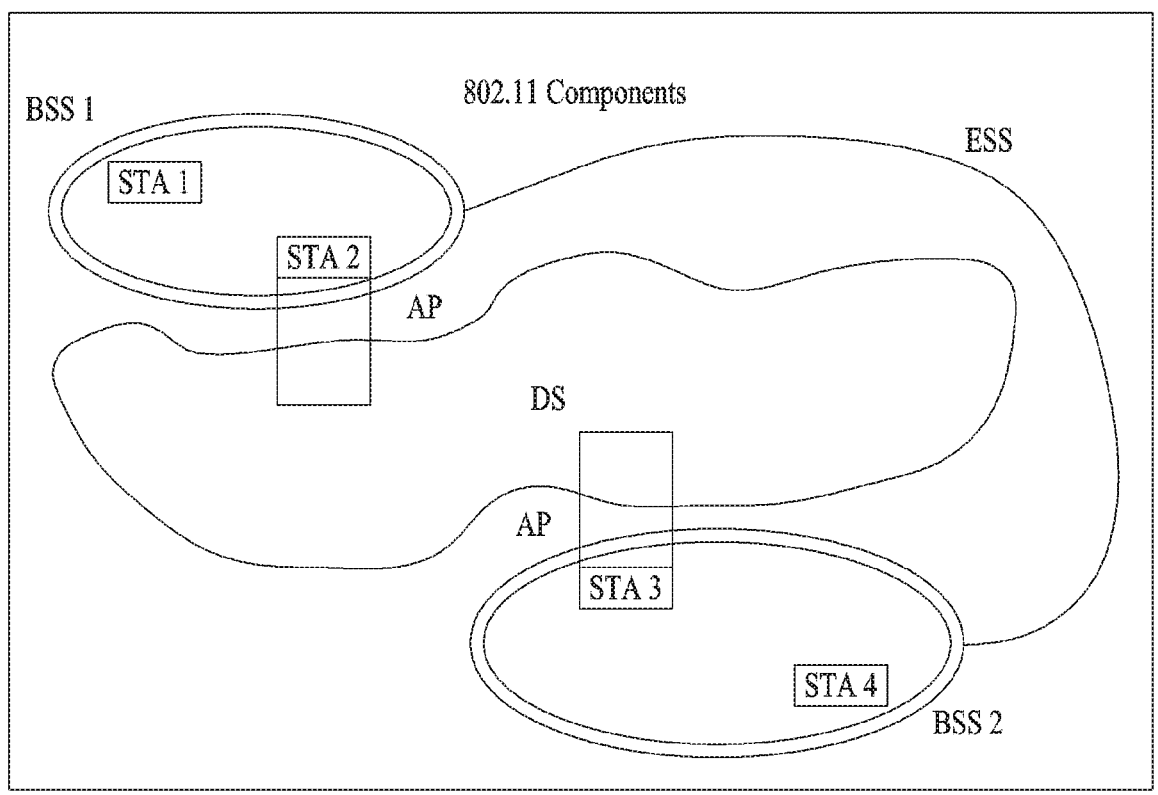
FIG. 2 is a view illustrating another exemplary configuration of a WLAN system.

FIG. 2 is a view illustrating another exemplary configuration of a WLAN system.

The BSS depicted in FIG. 2 corresponds to the infrastructure BSS. The infrastructure BSS includes at least one STA and an AP. Although a principle of a communication between non-AP STAs is to perform the communication via the AP, if a link is directly established between the non-AP STAs, it is possible to directly communicate between the non-AP STAs.

As depicted in FIG. 2, a plurality of infrastructure BSSs can be connected to each other via the DS. A plurality of the infrastructure BSSs connected through the DS is called an Extended Service Set (ESS). STAs included in the ESS can communicate with each other and a non-AP STA can move from one BSS to another BSS while seamlessly communicating in an identical ESS.

The DS is a mechanism connecting a plurality of APs to each other and the DS is not necessarily to be a network. If the DS is able to provide a prescribed distribution service, there is no limit on a form of the DS. For instance, the DS may correspond to such a wireless network as a mesh network or may correspond to a physical structure connecting APs to each other.

Figure 3:
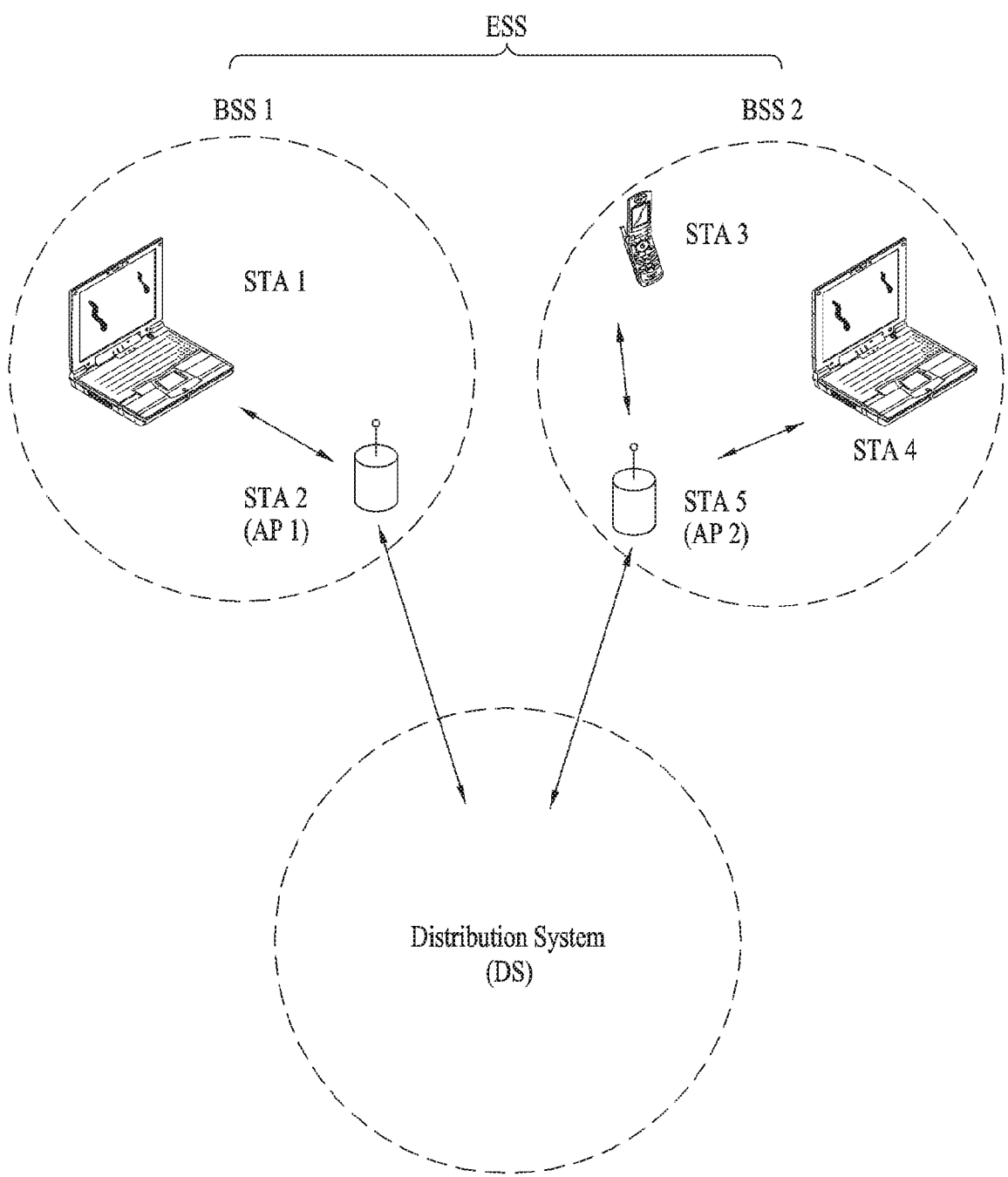
FIG. 3 is a view illustrating an exemplary structure of a WLAN system.
Figure 4:
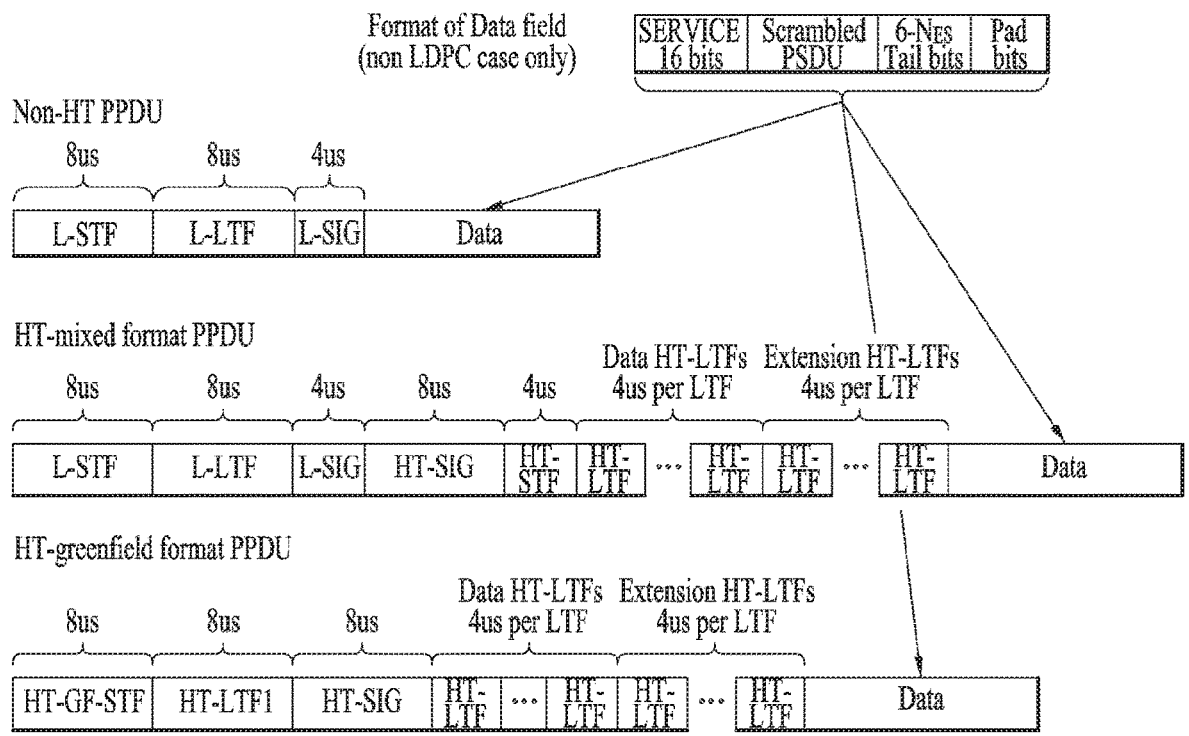

FIG. 3 is a view illustrating an exemplary structure of a WLAN system. In FIG. 3, an example of an infrastructure BSS including a DS is described.

Referring to an example of FIG. 3, ESS includes a BSS1 and BSS2. In a WLAN system, a station corresponds to a device operating according to MAC/PHY regulation of IEEE 802.11. A station includes an AP station and a non-AP station. In general, the non-AP station corresponds to such a device directly handled by a user as a laptop computer, a mobile phone, and the like. In the example of FIG. 3, a station 1, a station 3, and a station 4 correspond to the non-AP station and a station 2 and a station 5 correspond to the AP station.

In the following description, the non-AP station may be referred to as a terminal, a Wireless Transmit/Receive Unit (WTRU), a User Equipment (UE), a Mobile Station (MS), a mobile terminal, a Mobile Subscriber Station (MSS), and the like. And, the AP corresponds to a Base Station (BS), a Node-B, an evolved Node-B (eNB), a Base Transceiver System (BTS), a femto BS, and the like.

FIGS. 4 to 8 illustrate exemplary frame structures used in an Institute of Electrical and Electronics Engineers (IEEE) 802.11 system.

An STA may receive a PLCP Protocol Data Unit (PPDU). A PPDU frame may be formatted to include a Short Training Field (STF), a Long Training Field (LTF), a SIGNAL (SIG) field, and a Data field. For example, a PPDU frame format may be configured based on the type of the PPDU frame format.

For example, a non-High Throughput (non-HT) PPDU format may include only a Legacy-STF (L-STF), a Legacy-LTF (L-LTF), a SIG field, and a Data field.

The PPDU frame format type may be configured to be one of a HT-mixed format PPDU and an HT-greenfield format PPDU. The above-described PPDU format may further include an additional STF (or an STF of a different type), an additional LTF (or an LTF of a different type), and an additional SIG field (or a SIG field of a different type) between the SIG field and the Data field.

Figure 5:
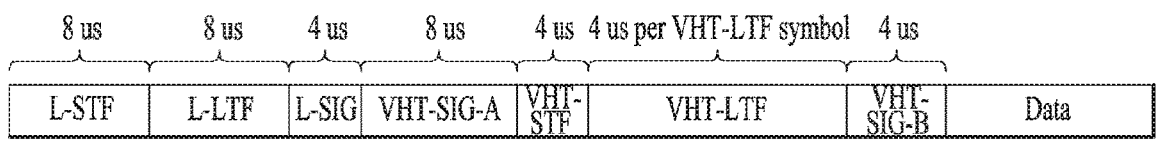

Referring to FIG. 5, a Very High Throughput (VHT) PPDU format may be configured. The VHT PPDU format may also include an additional STF (or an STF of a different type), an additional LTF (or an LTF of a different type), and an additional SIG field (or a SIG field of a different type) between the SIG field and the Data field. More specifically, at least one of a VHT-SIG-A field, a VHT-STF, a VHT-LTF, and a VHT SIG-B field may further be included between an L-SIG field and the Data field in the VHT PPDU format.

An STF may be a signal used for Automatic Gain Control (AGC), diversity selection, accurate time synchronization, etc. The STF and the LTF may be collectively referred to as a Physical Layer Convergence Protocol (PLCP) preamble, and the PLCP preamble may be a signal used for synchronization and channel estimation of an OFDM physical layer.

Figure 6:
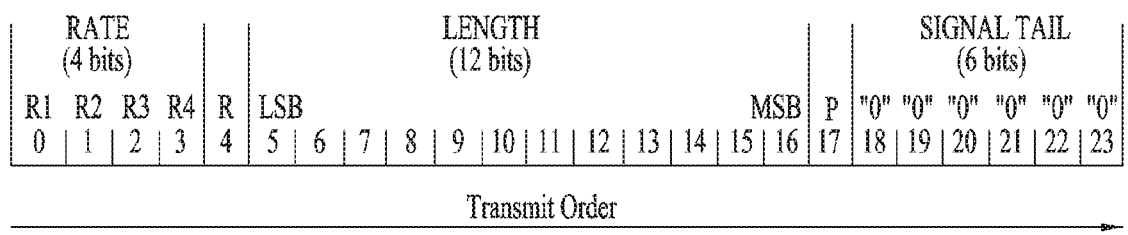

Referring to FIG. 6, the SIG field may include a RATE field and a LENGTH field. The RATE field may include information about modulation and a coding rate of data. The LENGTH field may include information about the length of the data. Additionally, the SIG field may include parity bits, and SIG Tail bits.

The Data field may include a SERVICE field, a PLCP Service DATA Unit (PSDU), and PPDU TAIL bits. When needed, the Data field may also include padding bits.

Figure 7:
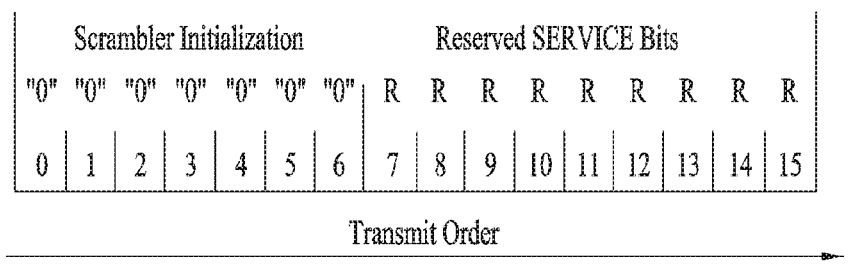

Referring to FIG. 7, a part of bits of the SERVICE field may be used for synchronization of a descrambler in a receiver, and another part of the bits of the SERVICE field may be reserved. The PSDU may correspond to a MAC Protocol Data Unit (PDU) defined at the MAC layer and include data generated/used by a higher layer. The PPDU TAIL bits may be used to return an encoder to a zero state. The padding bits may be used to match the length of the Data field to a predetermined unit.

As described before, for example, the VHT PPDU format may include an additional STF (or an STF of a different type), an additional LTF (or an LTF of a different type), and an additional SIG field (or a SIG field of a different type). The L-STF, the L-LTF, and the L-SIG may be a part for non-VHT in the VHT PPDU, and the VHT-SIG-A, the VHT-STF, the VHT-LTF, and the VHT-SIG-B may be a part for VHT. In other words, an area for non-VHT fields and an area for VHT fields may be separately defined in the VHT PPDU. For example, the VHT-SIG-A may include information for interpreting the VHT PPDU.

Referring to FIG. 8, for example, the VHT-SIG-A may include VHT SIG-A1 (FIG. 8(a)) and VHT SIG-A2 (FIG. 8(b)). Each of the VHT SIG-A1 and the VHT SIG-A2 may have 24 data bits, and the VHT-SIG A1 may precede the VHT-SIG A2. The VHT-SIG-A1 may include a Bandwidth (BW) field, a Space Time Block Coding (STBC) field, a Group Identifier (ID) field, a Number of Space-Time Streams (NSTS)/Partial Association ID (Partial AID) field, a TXOP_PS_NOT_ALLOWED field, and a Reserved field. The VHT SIG-A2 may include a Short Guard Interval (GI) field, a Short GI NSYM Disambiguation field, a Single User (SU)/Multi-User (MU)[0] Coding field, a Low Density Parity Check (LDPC) Extra OFDM Symbol field, an SU VHT-Modulation Coding Scheme (MCS)/MU[1-3] Coding field, a Beamformed field, a Cyclic Redundancy Check (CRC), a Tail, and a Reserved field. Information about the VHT PPDU may be acquired from the VHT SIG-A1 and the VHT SIG-A2.

FIG. 9 is a view illustrating exemplary physical layer protocol data unit (PPDU) formats that may be used in the present disclosure.

As described before, various PPDU formats are available. For example, a new PPDU format may be provided. A PPDU may include L-STF, L-LTF, L-SIG, and DATA fields. For example, the PPDU frame may further include HE-SIG A, HE-STF, HE-LTF, and HE-SIG B fields. The HE-SIG A field may include, for example, common information. For example, the common information may include Bandwidth, Guard Interval (GI), Length, BSS Color, and so on. For example, an L part (L-STF, L-LTF, and L-SIG) may be transmitted in a Single Frequency Network (SFN) mode on a 20-MHz basis in the frequency domain. For example, like the L part, the HE-SIG A field may be transmitted in the SFN mode on a 20-MHz basis. For example, if a channel has a bandwidth larger than 20 MHz, the L part and the HE-SIG A field may be duplicated on a 20-MHz basis and then transmitted. The HE SIG-B field may provide user-specific information. For example, the user-specific information may include an STA AID, resource allocation information (e.g., an allocation size), an MCS, $N_{sts}$, coding, STBC, TXBF, and so on. Further, the HE SIG-B field may be transmitted across a total bandwidth.

For example, referring to (b) of FIG. 9, a PPDU may be transmitted in an 80-MHz band. The L part and the HE-SIG A field may be duplicated on a 20-MHz basis and then transmitted, and the HE-SIG B field may be transmitted across the total 80-MHz band. However, the transmission scheme may be purely exemplary, not limited to the above embodiment.

Figure 10:
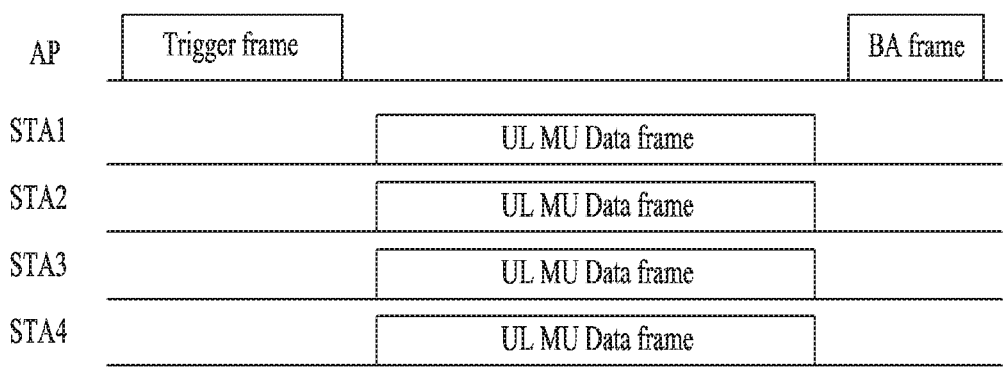
FIG. 10 is a view illustrating uplink multi-user (UL MU) transmission applicable to the present disclosure.

FIG. 10 is a view illustrating uplink multi-user (UL MU) transmission applicable to the present disclosure.

As described above, the AP may acquire a TXOP to access a medium, and transmit a signal by occupying the medium through contention. Referring to FIG. 10, the AP STA may transmit a trigger frame to a plurality of STAs to perform UL MU transmission. In this case, the trigger frame may include, for example, information about a resource allocation position and size, IDs of the STAs, MCS, and MU type (=MIMO, OFDMA) as UL MU allocation information. That is, the trigger frame transmitted by the AP STA to the plurality of STAs may be a frame allowing the plurality of STAs to perform UL data transmissions.

The plurality of STAs may transmit data to the AP after an SIFS elapses based on a format indicated by the trigger frame. The AP may then send ACK/NACK information to the STAs, and thus the STAs may perform UL MU transmissions.

Figure 11:
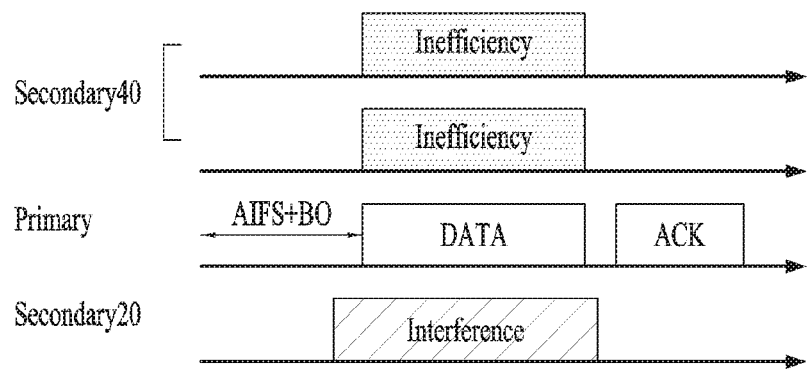

FIGS. 11 and 12 are views illustrating inefficiency of a legacy channel allocation scheme.

Referring to FIGS. 11 and 12, only when a contiguous channel including a primary channel is idle, a legacy VHT STA uses the contiguous channel. Specifically, FIG. 11 illustrates data transmission on a 20-MHz primary channel, when the primary channel is idle for a predetermined time, and FIG. 12 illustrates data transmission on a 40-MHz channel being a combination of a primary channel and a 20-MHz secondary channel, Secondary 20, when the primary channel and the 20-MHz secondary channel, Secondary 20 contiguous to the primary channel are idle for a predetermined time.

However, if channels are used in the above manner, another secondary channel, Secondary 40 is not used, thereby causing inefficiency, as illustrated in FIG. 11. Similarly in FIG. 12, a channel without interference in the secondary channel, Secondary 40 is not used, thus decreasing efficiency.

Figure 14:
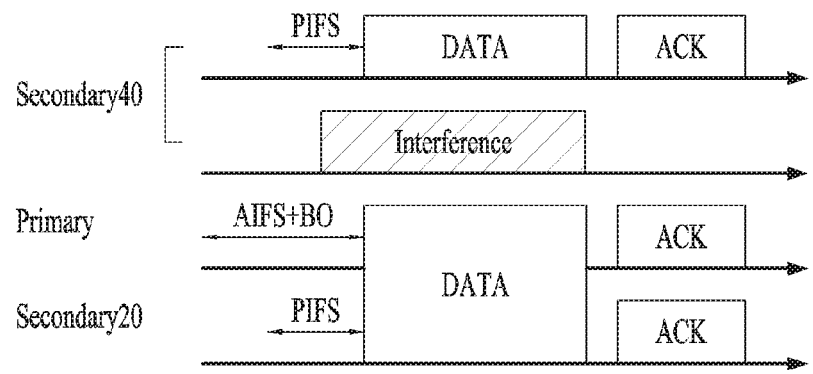

FIGS. 13 and 14 are views illustrating the concept of supporting a non-contiguous channel or a 60× MHz channel according to an embodiment of the present disclosure.

To solve the problem described with reference to FIGS. 11 and 12, a system which supports 60× MHz (x is a natural number) as illustrated in FIG. 13 or enables data transmission on a non-contiguous channel as illustrated in FIG. 14 is proposed in an embodiment of the present disclosure.

Specifically, FIG. 13 illustrates an example of configuring a 60-MHz channel with both the primary channel and the secondary channel, Secondary 40, except a busy channel part in the situation of FIG. 11. If a total bandwidth (BW) is 160 MHz, it is proposed that a channel of up to 120 (60×2) MHz is supported, compared to the legacy technology.

FIG. 14 illustrates a method for transmitting data on a non-contiguous channel except a channel with interference in the situation illustrated in the lower part of FIG. 12. That is, it is proposed that resources are used flexibly except only a channel unavailable due to interference or the like, compared to the legacy technology in which only a contiguous channel within a total BW is used.

In summary, the legacy system provides only brief information about 20, 40, 80, and 160 (or 80+80)-MHz units among contiguous BWs in a SIG field (BW field). However, an embodiment of the present disclosure proposes a method for indicating use of a 60× MHz contiguous BW or a non-contiguous band, as described above.

Figure 15:
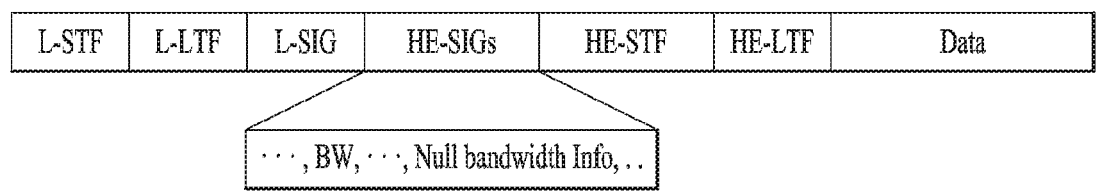
FIG. 15 is a view illustrating a resource allocation format to use a non-contiguous band or a 60× MHz band according to an embodiment of the present disclosure.

FIG. 15 is a view illustrating a resource allocation format to use a non-contiguous band or a 60× MHz band according to an embodiment of the present disclosure.

As shown in FIG. 15, when a frame is transmitted, an STA can include information on an unused bandwidth and information on a null indicator (e.g., null bandwidth/channel/sub-channel information or non-contiguous bandwidth/channel/subchannel information) in a HE-SIG field. It is preferable to include the information in the HE-SIG field only when a BW corresponds to 80 MHz or 160 (or 80+80) MHz.

In particular, the present invention proposes that the HE-SIG field includes bandwidth information indicating whether or not the whole bandwidth corresponds to 20, 40, 80, or 160 (or 80+80) MHz and information on a null indicator indicating a channel region not used for transmitting data among the whole bandwidth.

Information on currently used contiguous bandwidths or non-contiguous bandwidths can be included in the HE-SIG field instead of a null subchannel indicator. The information on the contiguous or non-contiguous bandwidths may indicate information on a practically used bandwidth or a subchannel Preferably, a unit may correspond to 20 MHz or a multiple of 20 MHz (e.g., 40 MHz, 80 MHz, . . . ).

Preferably, the HE-SIG field may correspond to a HE-SIG A. The HE-SIG A can be indicated by a common part of a HE-SIG B, L-SIG corresponding to a previous part of the HE-SIG A, phase rotation, or the like.

Figure 16:
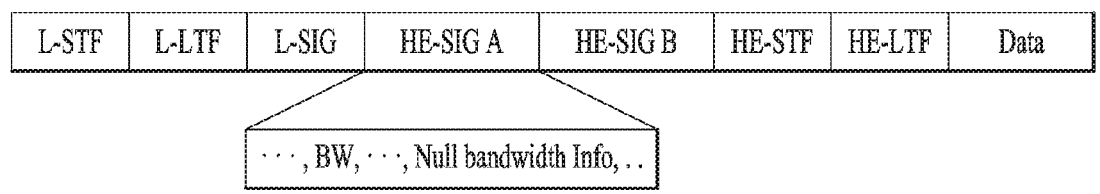
FIGS. 16 and 17 are views illustrating specific forms of the resource allocation format illustrated in FIG. 15.
Figure 17:
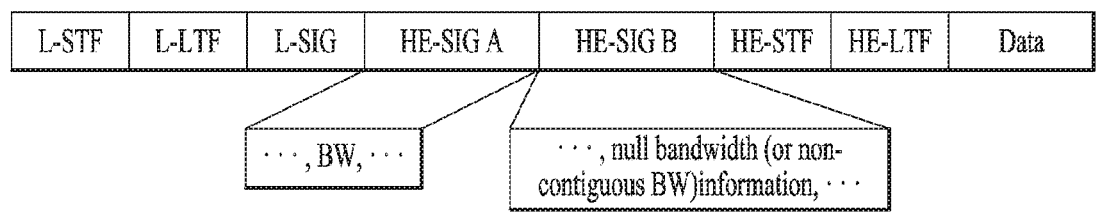

FIGS. 16 and 17 are views illustrating specific forms of the resource allocation format illustrated in FIG. 15.

As described before, an 11ax radio frame may include HE-SIG A and HE-SIG B as HE-SIG fields. In general, HE-SIG A may include common control information for a plurality of channels (users), and HE-SIG B may include information specific to each of the plurality of channels (or users). Further, HE-SIG B may be configured so that a predetermined part of HE-SIG B includes channel-common (user-common) information, and the remaining part of HE-SIG B includes channel-specific (user-specific) information.

If total BW information and null indication information are transmitted according to the foregoing embodiment, both the total BW information and the null indication information may be included in HE-SIG A, as illustrated in FIG. 16. Alternatively or additionally, as illustrated in FIG. 17, the total BW information may be included in HE-SIG A, and the null indication information may be included in HE-SIG B.

Now, a description will be given of a case in which a null indication is configured as a bitmap and a case in which a null indication is configured as an index indicating a channel combination, as specific examples of the foregoing embodiment.

Bitmap-Type Null Indication

Figure 18:
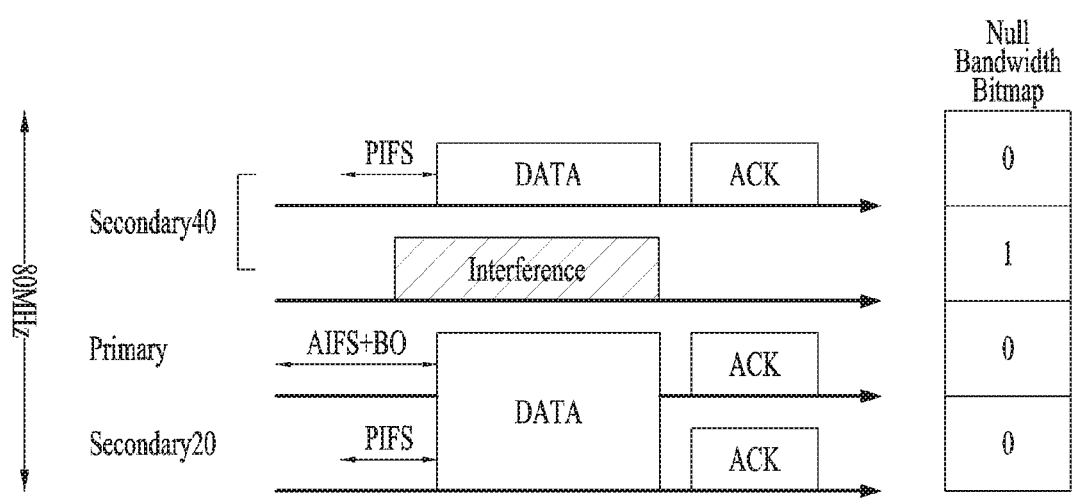
FIGS. 18 and 19 are exemplary views illustrating configuration of a null indication as a bitmap according to an embodiment of the present disclosure.
Figure 19:
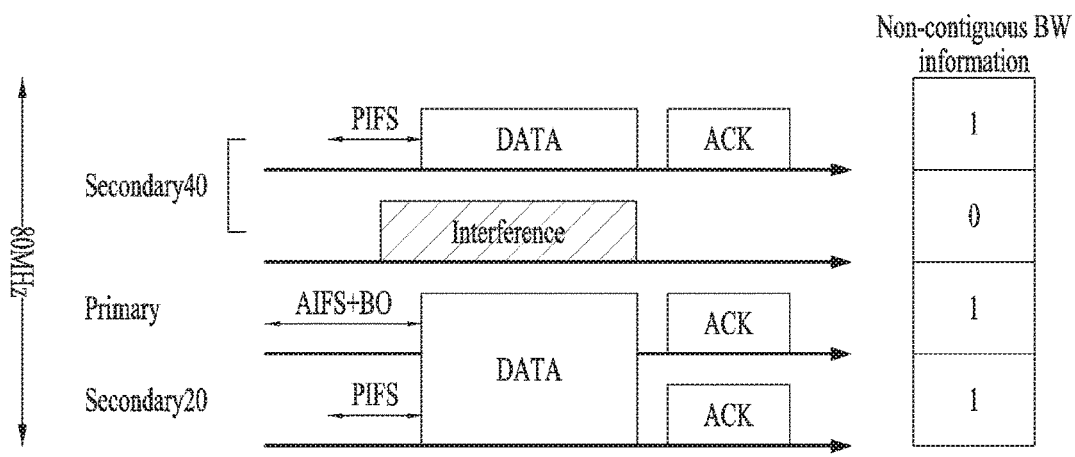

FIGS. 18 and 19 are exemplary views illustrating configuration of a null indication as a bitmap according to an embodiment of the present disclosure.

The null indication may be configured as a bitmap or an index, and included and transmitted in HE-SIG A or HE-SIG B, as described above. If the null indication is configured in the form of a bitmap, each bit of the bitmap may be mapped to a 20-MHz BW. In the bitmap, a bit set to 1 may indicate a non-allocated subband and a bit set to 0 may indicate an allocated subband in the example of FIG. 18. That is, a bitmap of 0100 may indicate that only the second 20-MHz channel is not used for data transmission, and the remaining first, third, and fourth 20-MHz channels are used for data transmission, among the 20-MHz channels in FIG. 18.

The bitmap may provide actually used BW information, instead of null BW information. Then, a bit is set to 1 to indicate an actually used channel and to 0 to indicate an unused channel in the bitmap. That is, although the null indication bitmap indicates null BWs, the bitmap may be configured to provide non-contiguous BW information. In other words, the bitmap may indicate BWs allocated for data transmission in FIG. 19, unlike FIG. 18. For example, the non-contiguous BW information may be represented as 1011 in the above example. FIG. 10 describes non-contiguous BW information, and although the term, null BW information is used for distinction, it may also be regarded as a kind of null indication.

For 80 MHz, the null indication may be configured as a 4-bit bitmap, whereas for 160 (or 80+80) MHz, the null indication may be configured as an 8-bit bitmap.

Figure 20:
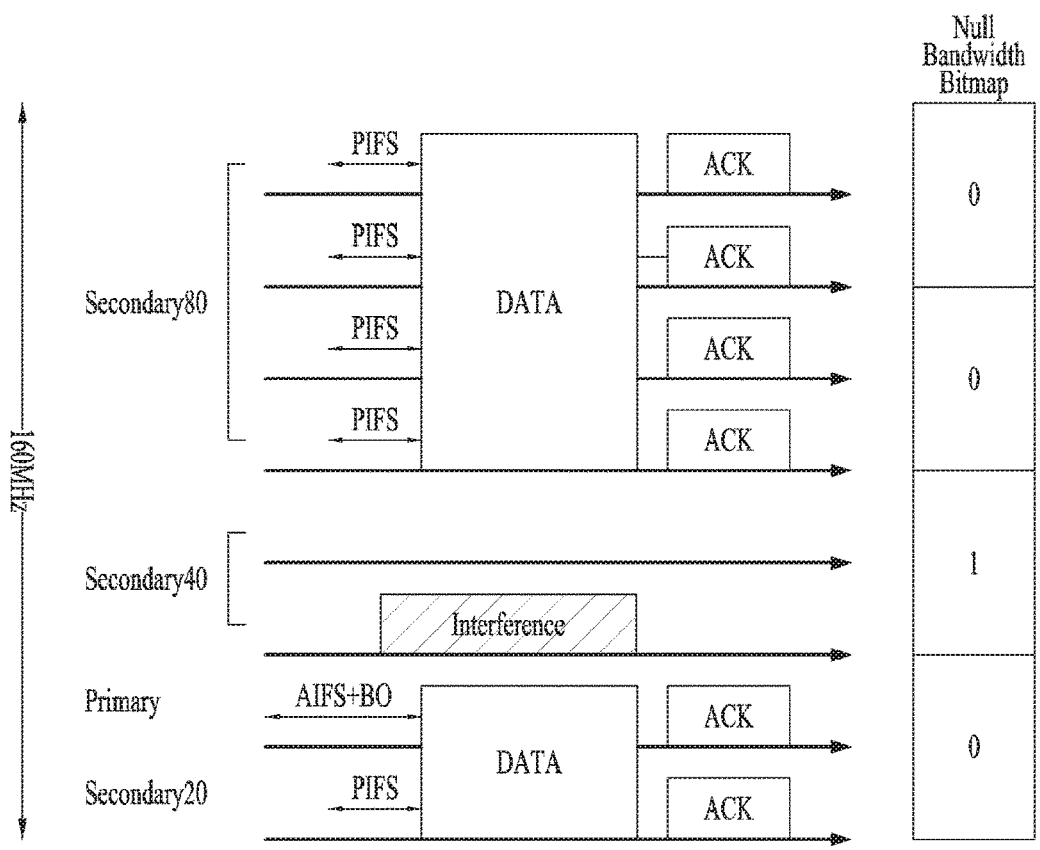
FIGS. 20 to 22 are views illustrating a resource allocation method for a total bandwidth of 160 MHz according to an embodiment of the present disclosure.
Figure 21:
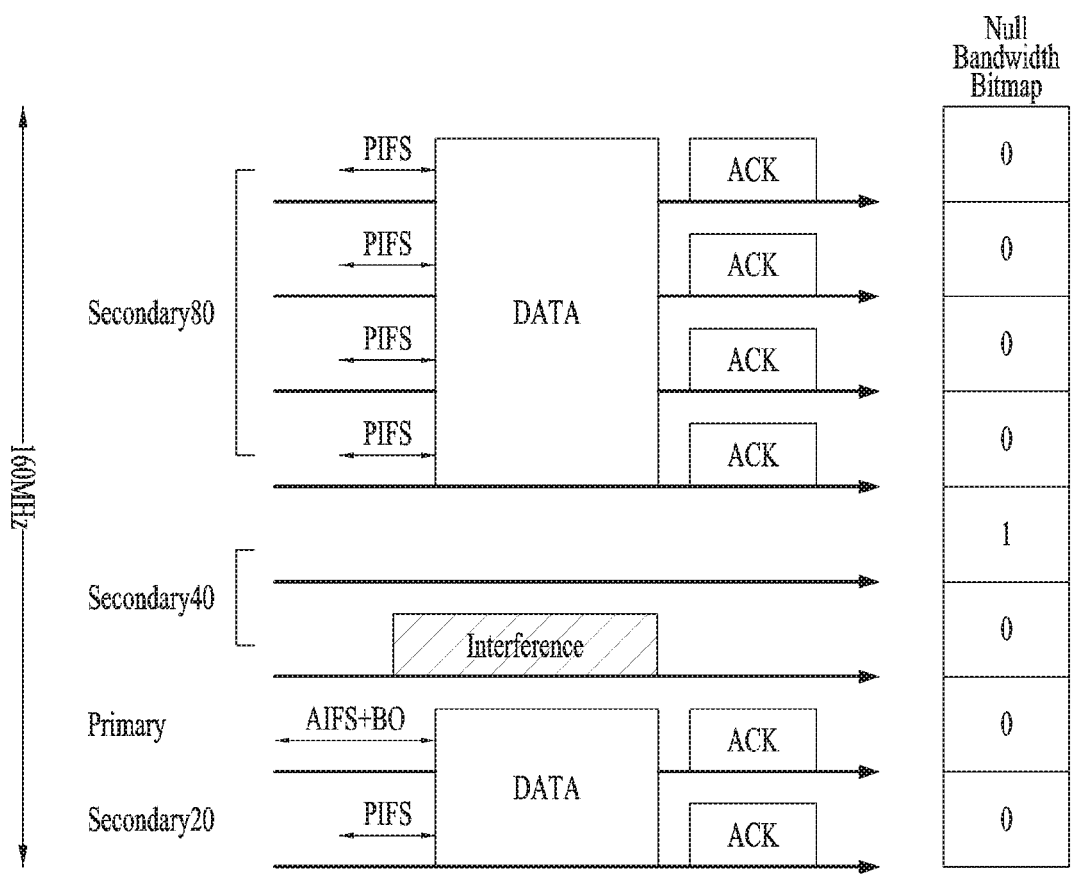
Figure 22:
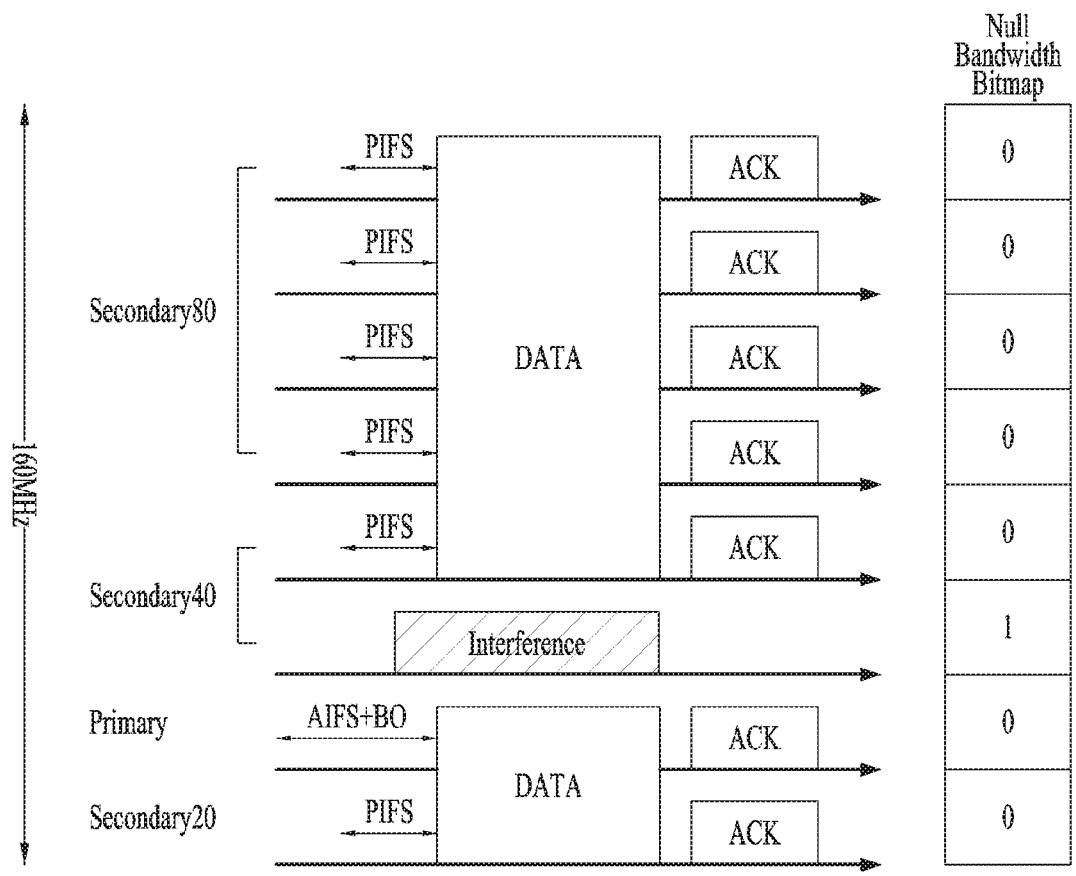

FIGS. 20 to 22 are views illustrating a resource allocation method for a total BW of 160 MHz according to an embodiment of the present disclosure.

For 160 (or 80+80) MHz, null BWs may be indicated on a 40-MHz basis, as illustrated in FIG. 20. In this case, a 4-bit bitmap may be configured for 160 MHz, as for 80 MHz.

In the above case, however, a partial band of a secondary channel, Secondary 40 may not be used, as illustrated in FIG. 20.

FIG. 21 illustrates an example of indicating null BWs on a 20-MHz basis for 160 (0r 80+80) MHz.

If all or part of the secondary channel, Secondary 40 has interference, none of the secondary channel, Secondary 40 is not used in the above example.

Unlike FIG. 21, if part of the secondary channel, Secondary 40 is used, a null BW bitmap may be configured as 00000100 in FIG. 22.

Similar to 11ac, if a primary channel concept is used, a bitmap can be configured by the remaining bits except primary channels. For example, a bitmap is configured by 3 bits in 80 MHz and each of the 3 bits indicates whether or not a corresponding secondary channel is included. Table 1 in the following illustrates an example that a bitmap is configured for a secondary channel except a primary channel.

TABLE 1

Bandwidth index bitmap

000: 20 MHz (primary)
100: 40 MHz (Contiguous, Primary + Secondary 20)
010: 40 MHz (Contiguous, Primary + 1st sub-CH of Seondary 40)
001: 40 MHz (Non-contiguous, Primary + 2nd sub-CH of Secondary 40)
110: 60 MHz (Contiguous, Primary+ Secondary 20 + 1st sub-CH of Secondary 40)
011: 60 MHz (Contiguous, Primary+ Secondary 40)
101: 60 MHz (Non-contiguous, Primary + Secondary 20 + 2nd sub-CH of Secondary 40)
111: 80 MHz (Contiguous)

A similar bitmap may be configured for 160 (or 80+80) MHz. That is, a 7-bit bitmap may correspond to respective secondary channels, Secondary 20, Secondary 40, and Secondary 80, and may indicate which secondary channel is used along with a primary channel, as follows.

TABLE 2

0000000: 2 MHz (primary)
1000000: 40 MHz (Contiguous, Primary + Secondary 20)
0100000: 40 MHz (Contiguous, Primary + 1st sub-CH of Seondary 40)
0010000: 40 MHz (Non-contiguous, Primary + 2nd sub-CH of Secondary 40)
1100000: 60 MHz (Contiguous, Primary+ Secondary 20 + 1st sub-CH of Secondary 40)
0110000: 60 MHz (Contiguous, Primary+ Secondary 40)
1010000: 60 MHz (Non-contiguous, Primary + Secondary 20 + 2nd sub-CH of Secondary 40)
1110000: 80 MHz (Contiguous)
.....
1111111: 160 MHz or (80+80) MHz 3 bits may be used to indicate BW indexes, and additional information about contiguous/non-contiguous channels may be represented as follows, inclusive of legacy BW information (20/40/80/160 MHz).

TABLE 3

Bandwidth index (3 bits)

0: 20 MHz (primary)
1: 40 MHz (Contiguous, Primary + Secondary 20)
2: 40 MHz (Contiguous, Primary + 1st sub-CH of Seondary 40)
3: 40 MHz (Non-contiguous, Primary + 2nd sub-CH of Secondary 40)
4: 60 MHz (Contiguous, Primary+ Secondary 20 + 1st sub-CH of Secondary 40)

TABLE 3-continued

Bandwidth index (3 bits)

5: 60 MHz (Contiguous, Primary+ Secondary 40)
6: 80 MHz (Contiguous)
7: 160 MHz or 80+80 MHz The example above illustrates an example that 60 MHz non-contiguous is omitted. Instead, legacy 160 MHz or 80+80 MHz is included.

If 60 MHz non-contiguous is not omitted, it may have Table 4 described in the following.

TABLE 4

Bandwidth index (4 bits)

0: 20 MHz (primary)
1: 40 MHz (Contiguous, Primary + Secondary 20)
2: 40 MHz (Contiguous, Primary + 1st sub-CH of Seondary 40)
3: 40 MHz (Non-contiguous, Primary + 2nd sub-CH of Secondary 40)
4: 60 MHz (Contiguous, Primary+ Secondary 20 + 1st sub-CH of Secondary 40)
5: 60 MHz (Contiguous, Primary+ Secondary 40)
6: 60 MHz (Non-contiguous, Primary+Secondary 20 + 2nd sub-CH of Secodnary 40)
7: 80 MHz (Contiguous)
8: 160 MHz or 80+80 MHz
9-15: Reserved The meaning of the secondary channel shown in Table 1 can be changed as follows.

TABLE 5

Bandwidth index (3 bits)

0: 20 MHz (primary)
1: 40 MHz (Primary CH + 1st Secondary CH)
2: 40 MHz (Primary CH + 2nd Secondary CH)
3: 40 MHz (Primary CH + 3rd Secondary CH)
4: 60 MHz (Primary CH + 1st Secondary CH + 2nd Secondary CH)
5: 60 MHz (Primary CH + 2nd Secondary CH + 3rd Secondary CH)
6: 60 MHz (Primary CH + 1st Secondary CH + 3rd Secondary CH)
7: 80 MHz (Contiguous)

The meaning of the secondary channel shown in Table 3 can be changed as follows.

TABLE 6

Bandwidth index (3 bits)

0: 20 MHz (primary)
1: 40 MHz (Primary CH + 1st Secondary CH)
2: 40 MHz (Primary CH + 2nd Secondary CH)
3: 40 MHz (Primary CH + 3rd Secondary CH)
4: 60 MHz (Primary CH + 1st Secondary CH + 2nd Secondary CH)
5: 60 MHz (Primary CH + 2nd Secondary CH + 3rd Secondary CH)
6: 80 MHz
7: 160 MHz or 80+80 MHz The meaning of the secondary channel shown in Table 3 can also be changed as follows.

TABLE 7

Bandwidth index (4 bits)

0: 20 MHz (primary)
1: 40 MHz (Primary CH + 1st Secondary CH)
2: 40 MHz (Primary CH + 2nd Secondary CH)
3: 40 MHz (Primary CH + 3rd Secondary CH)

TABLE 7-continued

Bandwidth index (4 bits)

4: 60 MHz (Primary CH + 1st Secondary CH + 2nd Secondary CH)
5: 60 MHz (Primary CH + 2nd Secondary CH + 3rd Secondary CH)
6: 60 MHz (Primary CH + 1st Secondary CH + 3rd Secondary CH)
7: 80 MHz (Contiguous)
8: 160 MHz or 80+80 MHz
9-15: Reserved Meanwhile, if a null bandwidth is not included in 80 MHz or 160 MHz, null bandwidth information may become unnecessary information. Hence, according to one embodiment of the present invention, it may be able to selectively include the null bandwidth information by indicating whether or not the null bandwidth information is included. In particular, it may be able to make the null bandwidth information (e.g., bitmap) to be included in the HE-SIG field only when a null bandwidth presence is set to 1.

Figure 23:
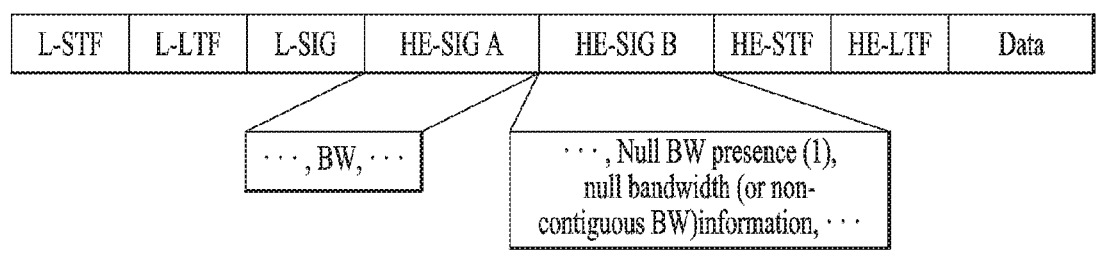
FIG. 23 is an exemplary view illustrating a Null Bandwidth (BW) Presence field according to an embodiment of the present disclosure.

FIG. 23 is an exemplary view illustrating a Null Bandwidth (BW) Presence field according to an embodiment of the present disclosure.

When a BW field is included in HE-SIG A, if a BW corresponds to 80 MHz or 160 MHz, as shown in FIG. 22, the null bandwidth information can be transmitted in a manner of being included in HE-SIG B. And, as shown in FIG. 22, if null bandwidth presence is included, the null bandwidth information can be included or omitted depending on a value of the null bandwidth presence.

More preferably, the value of the null bandwidth presence is included in the HE-SIG A via a bitmap indicating the whole bandwidth. If the null bandwidth presence is set to 1, the null bandwidth information (information on whether or not a subchannel is used) can be included in the HE-SIG B (e.g., SIG B common part).

Index-Type Null Indication

As described before, a null BW bitmap is an example of null subband information. The null subband information may be indicated by a form other than a null BW bitmap.

The following table is an example of indicating null subband information in 80 MHz by an index.

TABLE 8

| Index | P-CH | 1st S-CH | 2nd S-CH | 3rd S-CH | Notes |
|---|---|---|---|---|---|
| 1 | o | o | o | x | 60 MHz |
| 2 | o | o | x | o | |
| 3 | o | x | o | o | |
| 4 | o | x | o | x | Non-contiguous 40 MHz |
| 5 | o | x | x | o | |

In the example of [Table 8], o indicates allocation of a band, and x indicates non-allocation of a band.

Index 1 indicates a contiguous 60-MHz channel including a primary channel Indexes 2 and 3 indicate non-contiguous 60-MHz BWs, and Indexes 4 and 5 indicate non-contiguous 40-MHz BWs.

The following table illustrates another example. A column representing the primary channel is interposed between columns representing the secondary channels, Secondary 20 and Secondary 40.

TABLE 9

| Index | Secondary 20 | Primary CH | Secondary 40 | Secondary 40 | Notes |
|---|---|---|---|---|---|
| 1 | o | o | o | x | 60 MHz |
| 2 | o | o | x | o | |
| 3 | x | o | o | o | |
| 4 | x | o | o | x | Non-contiguous 40 MHz |
| 5 | x | o | x | o | |

It is able to transmit a frame without including a primary CH. A table in the following illustrates an example of including the primary CH.

TABLE 10

| Index | P-CH | 1st S-CH | 2nd S-CH | 3rd S-CH | Notes |
|---|---|---|---|---|---|
| 1 | o | o | o | x | 60 MHz |
| 2 | o | o | x | o | 60 MHz |
| 3 | o | x | o | o | 60 MHz |
| 4 | x | o | o | o | 60 MHz |
| 5 | o | x | o | x | 40 MHz |
| 6 | o | x | x | o | 40 MHz |
| 7 | x | o | o | x | 40 MHz |
| 8 | x | o | x | o | 40 MHz |
| 9 | x | x | o | o | 40 MHz |
| 10 | x | o | x | x | 20 MHz |
| 11 | x | x | o | x | 20 MHz |
| 12 | x | x | x | o | 20 MHz |

A method similar to the abovementioned method can be defined in 160 MHz. A table in the following illustrates an example of indicating a null bandwidth in a unit of 40 MHz in 160 MHz.

TABLE 11

| Index | P-CH, 1st S-CH | 2nd & 3rd S-CH | 4th & 5th S-CH | 6th & 7th S-CH | Notes |
|---|---|---|---|---|---|
| 1 | o | o | o | x | 120 MHz |
| 2 | o | o | x | o | |
| 3 | o | x | o | o | |
| 4 | o | x | o | x | Non-contiguous 80 MHz |
| 5 | o | x | x | o | |

It is able to transmit a frame without including a primary CH. A table in the following illustrates an example of including the primary CH.

TABLE 12

| Index | P-CH, 1st S-CH | 2nd & 3rd S-CH | 4th & 5th S-CH | 6th & 7th S-CH | Notes |
|---|---|---|---|---|---|
| 1 | o | o | o | x | 120 MHz |
| 2 | o | o | x | o | |
| 3 | o | x | o | o | |
| 4 | x | o | o | o | |
| 5 | o | x | o | x | 80 MHz |
| 6 | o | x | x | o | |
| 7 | x | o | o | x | |
| 8 | x | o | x | o | |
| 9 | x | x | o | o | |
| 10 | x | o | x | x | 40 MHz |
| 11 | x | x | o | x | |
| 12 | x | x | x | o | |

A table in the following illustrates an example of indicating allocation information of a bandwidth in a unit of 20 MHz in 160 MHz.

TABLE 13

| Index | P-CH | 1st S-CH | 2nd S-CH | 3rd S-CH | 4th S-CH | 5th S-CH | 6th S-CH | 7th S-CH | Notes |
|---|---|---|---|---|---|---|---|---|---|
| 1 | o | o | o | o | o | o | o | x | 140 |
| 2 | o | o | o | o | o | o | x | o | |
| 3 | o | o | o | o | o | x | o | o | |
| 4 | o | o | o | o | x | o | o | o | |
| 5 | o | o | o | x | o | o | o | o | |
| 6 | o | o | x | o | o | o | o | x | |
| 7 | o | x | o | o | o | o | o | o | |
| 8 | o | o | o | o | o | o | x | x | 120 |
| 9 | o | o | o | o | o | x | o | x | |
| 10 | o | o | o | o | x | o | o | x | |
| 11 | o | o | o | x | o | o | o | x | |
| 12 | o | o | x | o | o | o | o | x | |
| 13 | o | x | o | o | o | o | o | x | |
| 14 | o | o | o | o | o | x | x | x | 100 MHz |
| 15 | o | o | o | o | x | o | x | x | |
| 16 | o | o | o | x | o | o | x | x | |
| 17 | o | o | x | o | o | o | x | x | |
| ... | ... | ... | ... | ... | ... | ... | ... | ... | |

Null subband information (non-contiguous BW information) can be used together with a legacy BW index.

TABLE 14

| BW Index | | | | | |
|---|---|---|---|---|---|
| 1 | 20 MHz | | | | |
| 2 | 40 MHz | | | | |
| 3 | 80 MHz | | | | |
| 4 | 160 or (80 + 80) MHz | | | | |

| | P-CH | 1st S-CH | 2nd S-CH | 3rd S-CH | Notes |
|---|---|---|---|---|---|
| 5 | o | o | o | x | 60 MHz |
| 6 | o | o | x | o | |
| 7 | o | x | o | o | |
| 8 | o | x | o | x | 40 MHz |
| 9 | o | x | x | o | |

| | P-CH, 1st S-CH | 2nd & 3rd S-CH | 4th & 5th S-CH | 6th & 7th S-CH | Notes |
|---|---|---|---|---|---|
| 10 | o | o | o | x | 120 MHz |
| 11 | o | o | x | o | |
| 12 | o | x | o | o | |
| 13 | o | x | o | x | 80 MHz |
| 14 | o | x | x | o | |

In the above example, BW information indicates inclusion of the primary channel all the time. In 160 MHz, a subband unit is 40 MHz. Various combinations may be produced from these indexes.

(1) Primary channel included & basic subband unit=40 MHz in 160 MHz->indexes are configured as illustrated in [Table 14].

(2) Primary channel included & basic subband unit=20 MHz in 160 MHz (3) Primary channel not included & basic subband unit=40 MHz in 160 MHz (4) Primary channel not included & basic subband unit=20 MHz in 160 MHz In the above example, subband use/non-use information (e.g., null BW information/non-contiguous subband information, or non-allocated subband indication information) is provided for each 20-MHz unit in 80 MHz, and each 40-MHz or 20-MHz unit in 160 MHz. The unit may be referred to as a different term or form corresponding to the same size.

[Table 15] below describes an exemplary time-frequency frame structure in an 11ax system.

TABLE 15

< Example of time-frequency frame structure in 11ax>

FFT size (4-times extension from existing WiFi numerology): 256FFT for 20 MHz, 512FFT for 40 MHz, 1024FFT for 80 MHz, 2048FFT for contiguous 160 MHz or each 1024FFT for non-contiguous 160 MHz BW
Subcarrier spacing: 78.125 kHz (¼ of existing WiFi numerology)
IDFT/DFT length: 3.2 μs * 4 = 12.8 μs
OFDM symbol length: IDFT/DFT length + GI In the 11ax frame structure, a single basic resource unit configured by 242 tones can be configured in 20 MHz. Two basic resource units and four basic resource units can be configured in 40 MHz and 80 MHz, respectively. In this case, 20 MHz can be indicated in a manner of being replaced with a resource unit configured by 242 tones. 40 MHz can be indicated in a manner of being replaced with 2 contiguous resource units each of which is configured by 242 tones (24 tone resource unit*2=40 MHz). In this case, the resource units may become identical to the aforementioned information indicating whether or not a subband is used. For example, if a resource unit is represented by a bitmap, the resource unit is configured by a bitmap of 4 bits in 80 MHz. In 140 MHz, if a basic null resource unit has a size of 20 MHz (242 tone resource unit*2), the basic null resource unit is configured by a bitmap of 4-bit size. If the basic null resource unit has a size of 20 MHz (242 tone resource unit), the basic null resource unit is configured by a bitmap of 16-bit size. In case of using an index, the abovementioned definition can be similarly defined.

A table in the following illustrates a different example of a non-contiguous bandwidth information format.

TABLE 16

Bandwidth index (4 bits, B4B3B2B1)

MSB 1bit(b4): indicates whether the BW is 80 MHz BW or not.
If (b4==1) { // 80 MHz
B3b2b1: each bit is mapped to each of secondary channel. B3 is mapped to a first secondary channel, B2 is mapped to a second secondary channel, and B1 is mapped to a third secondary channel. For example, 010 indicate that a primary channel and a secondary channel are used.
} else { // b4==0, indicates a different bandwidth except 80 MHz.

TABLE 16-continued

Bandwidth index (4 bits, B4B3B2B1)

B3B2B1 //(includes a primary channel)
000: 20 MHz BW
001: 40 MHz BW
010: 160 MHz BW or 80 + 80 MHz BW
011 ~ 111: reserved
}

A table in the following illustrates an example of supporting partial contiguous or non-contiguous channel boding in 160 MHz using the remaining reserved bits.

TABLE 17

Bandwidth index (4 bits, B4B3B2B1)

MSB 1bit(b4): indicates whether it is 80 MHz BW or not.
If (b4==1) { // 80 MHz,
B3b2b1: each bit is mapped to each of secondary channels. B3 is mapped to a first secondary channel secondary channel (e.g., secondary 20), B2 is mapped to a second secondary channel (e.g., $1^{st}$ 20 of Secondary 40), and B1 is mapped to the third secondary channel (e.g., $2^{nd}$ 20 of Secondary 40). Naturally, the mapping order can be changed.
For example, 010 indicates that a primary channel and a secondary channel are used.
} else { // b4==0, indicates a different bandwidth except 80 MHz. A bandwidth equal to or wider than 80 MHz corresponds to a bandwidth including primary 80.
B3B2B1 //(includes a primary channel)
000: 20 MHz BW
001: 40 MHz BW
010: 160 MHz BW or 80 + 80 MHz BW
011: 100 MHz (Contiguous, Primary 80 + $1^{st}$ secondary CH of secondary 80)
100: 120 MHz (Contiguous, Primary 80 + $1^{st}$ and $2^{nd}$ secondary CHs of secondary 80)
101: 120 MHz (Non-contiguous, Primary 80 + $3^{rd}$ and $4^{th}$ secondary CHs of secondary 80)
110: 140 MHz (Contiguous, Primary 80 + $1^{st}$, $2^{nd}$, and $3^{rd}$ secondary CHs of secondary 80)
111: 140 MHz (Non-contiguous, Primary 80 + $1^{st}$, $3^{rd}$, and $4^{th}$ secondary CHs of secondary 80)
}

Non-contiguous bandwidth information can be transmitted in a manner of being included in L-SIG In this case, it is able to obtain a combining gain from HE-SIG A.

TABLE 18

Bandwidth index (4 bits, B4B3B2B1)

MSB 1bit(b4): indicates information on a BW equal to or narrower than 80 MHz and subchannels.
If (b4==1) { // contiguous/non-contiguous BWs<=80 MHz,
B3b2b1: Each bit is mapped to each of secondary channels. B3 is mapped to a first secondary channel secondary channel (e.g., Secondary 20), B2 is mapped to a second secondary channel (e.g., 1st 20 of Secondary 40), and B1 is mapped to a third secondary channel (e.g., 2nd 20 of Secondary 40). Naturally, the mapping order can be changed.
For example, 010 indicate that a primary channel and a secondary channel are used.
} else { // b4==0 , Contiguous / non-contiguous BWs > 80 MHz indicates a different bandwidth except 80 MHz. A bandwidth equal to or wider than 80 MHz corresponds to a bandwidth including primary 80.
B3B2B1 //(includes a primary channel)
000: 160 MHz BW or 80 + 80 MHz BW
001: 100 MHz (Contiguous, Primary 80 + 1st secondary CH of secondary 80)
010: 120 MHz (Contiguous, Primary 80 + 1st and 2nd secondary CHs of secondary 80)
011: 120 MHz (Non-contiguous, Primary 80 + 3rd and 4th secondary CHs of secondary 80)
100: 120 MHz (Non-contiguous, Primary 80 + 2nd and 3rd secondary CHs

TABLE 18-continued

Bandwidth index (4 bits, B4B3B2B1)

of secondary 80)
101: 140 MHz (Contiguous, Primary 80 + 1st, 2nd ,and 3rd secondary CHs of secondary 80)
110: 140 MHz (Contiguous, Primary 80 + 1st, 2nd ,and 4th secondary CHs of secondary 80)
111: 140 MHz (Non-contiguous, Primary 80 + 1st, 3rd , and 4th secondary CHs of secondary 80)
}

A combination of bandwidths equal to or wider than 80 MHz can be expressed in a manner of being different from the abovementioned combination.

A table in the following illustrates a further different example for contiguous/non-contiguous BWs.

TABLE 19

* Bandwidth index (4 bits, b4b3b2b1)
* MSB 1bit (b4): indicates whether a BW corresponds to a BW equal to or narrower than 80 MHz (e.g., 20 MHz, 40 MHz) or a BW of 160 MHz using information on subchannels.
- if b4 corresponds to 0, it indicates a BW equal to or narrower than 80 MHz (i.e.., 20 MHz, 40 MHz).
- if b4 corresponds to 1, , it indicates a BW of 160 MHz.
* If (b4 == 0) { // contiguous/non-contiguous BWs<=80 MHz,
B3b2b1: Each bit is mapped to each of secondary channels. B3 is mapped to a first secondary channel secondary channel (e.g., Secondary 20), B2 is mapped to a second secondary channel (e.g., 1st 20 of Secondary 40), and B1 is mapped to a third secondary channel (e.g., 2nd 20 of Secondary 40). Naturally, the mapping order can be changed.
For example, 010 indicate that a primary channel and a secondary channel are used.
If all bits are 0 (i.e., b3b2b1=000), it indicates a BW of 20 MHz. If a bit (i.e., B3 corresponding to a secondary channel of 20 MHz) corresponding to a secondary channel belonging to primary 40 is set to 1 (i.e., b3b2b1=100), it indicates a BW of 40 MHz. The rest of cases indicate a BW of 80 MHz.
If bits indicate a BW of 80 MHz, contiguous/non-contiguous channels (i.e.,
contiguous/non-contiguous channels except a channel indicated by a BW of 40 MHz, contiguous/non-contiguous channels having a size of 60 MHz) exist in 80 MHz.
} else { // b4==1 , indicates a BW of 160 MHz. In 160 MHz, Contiguous / non-contiguous may exist.
B3B2B1: when the remaining secondary channels except primary 40 are bundled in a unit of 40 MHz in 160 MHz(or 80+80 MHz), each bit corresponds to each of secondary channels having a size of 40 MHz. For example, B3 indicates the remaining secondary channels (i.e., secondary 40) except primary 40 belonging to primary 80. B2 indicates a first secondary channel in a unit of 40 MHz in secondary 80 and B1 indicates a
second secondary channel in a unit of 40 MHz in secondary 80. In the abovementioned example, assume that transmission is always performed together with primary 40.
}

A table in the following illustrates a further different example for contiguous/non-contiguous BWs.

TABLE 20

? Bandwidth index (3 bits, b0b1b2)
? MSB 1bit (b0): indicates whether a BW corresponds to a BW equal to or narrower than 80 MHz (e.g., 20 MHz, 40 MHz) or a BW of 160 MHz using information on subchannels.
- if b0 corresponds to 0, it indicates a BW equal to or narrower than 80 MHz (i.e.., 20 MHz, 40 MHz).
- if b0 corresponds to 1, it indicates a BW of 160 MHz.
? If (b0 == 0) { // contiguous/non-contiguous BWs<=80 MHz,
b1b2: 00 indicates a BW of 20 MHz. 01 indicates a BW of 40 MHz. 10 indicates a BW of contiguous 80 MHz. In particular, all of 80 MHz are used for transmission. 11 indicates channel boding in a BW of 80 MHz. In TABLE 20-continued particular, 11 indicate that a primary channel (20 MHz) and a secondary channel (40 Mhz) are used in 80 MHz in a manner of being bonded.
      } else { // b0==1 , indicates a BW of 160 MHz. In 160 MHz, channels may exist in a manner of being bonded.
B1b2: 00 indicates all of 160 MHz (or 80+80 MHz) are used (i.e., contiguous 160 MHz channel or non-contiguous 80+80 MHz channel). 01 indicates that a primary channel of 20 MHz and a secondary channel of 80 MHz are used in 160 MHz. 10 indicates that a primary channel of 40 MHz and a secondary channel of 40 MHz are used. 11 indicate that a primary channel of 20 MHz, a secondary channel of 40 MHz, and a secondary channel of 80 MHz are used.
      }

A table in the following illustrates a further different example for contiguous/non-contiguous BWs.

TABLE 21

\*      Bandwidth index (3 bits, b0b1b2)
000 indicates a BW of 20 MHz. 001 indicates a BW of 40 MHz. 010 indicates a contiguous BW of 80 MHz. In particular, all of 80 MHz are used for transmission. 011 indicates channel boding in a BW of 80 MHz. In particular, 011 indicates thata primary channel of 20 MHz and a secondary channel of 40 MHz are used in 80 MHz in a manner of being bonded.
100 indicate that all of 160 MHz (or 80+80 MHz) are used (i.e., contiguous
160 MHz channel or non-contiguous 80+80 MHz channel). 101 indicate that a primary 20 MHz and a secondary 80 MHz are used in 160 MHz. 110
indicate that a primary 40 MHz and a secondary 80 MHz are used. 111 indicate that a primary 20 MHz, a secondary 40 MHz and a secondary 80 MHz are used.
If b0 corresponds to 0, the abovementioned example indicates a BW equal to or narrower than 80 MHz (i.e., 20 MHz, 40 MHz). In a BW of 80 MHz,
subchannels can be used in a manner of being bonded. If the b0 corresponds to 1, it indicates a PPDU transmission BW of 160 MHz.
It may use channels by contiguously/non-contiguously bonding the channels.
      }

In the examples above, when the null bandwidth information (or non-contiguous channel information) is indicated by a bitmap in a unit of 20 MHz, a bitmap of 4 bits is configured in 80 MHz and a bitmap of 8 bits is configured in 160 MHz. If a primary channel is excluded, a bitmap of 3 bits is configured in 80 MHz and a bitmap of 7 bits is configured in 160 MHz. When a bitmap is configured in a unit of 40 MHz in 160 MHz, a bitmap of 3 bits (a primary channel is not included in the bitmap) or a bitmap of 4 bits can be configured depending on whether or not a primary channel is included. As shown in Table 17, if primary channel information (information indicating whether or not a BW includes primary 20 or primary 40) is included in HE-SIG A and detail null bandwidth information (or non-contiguous channel information) is included in HE-SIG B, information included in the SIG B can be reduced.

A table 22 in the following illustrates an example of a bandwidth index of 3 bits (b0b1b2) included in the HE-SIG A.

TABLE 22

\*      Bandwidth index (3 bits, b0b1b2) in HE-SIG A
\*      000: 20 MHz
\*      001: 40 MHz
\*      010: 80 MHz (preamble fully populated on all 4 channels and OFDMA uses 80 MHz design)
\*      011: 160 MHz (preamble fully populated on all 8 channels and TABLE 22-continued OFDMA uses 160 MHz design)
\*      100: 80 MHz channel bonding with preamble on P40
\*      101: 80 MHz channel bonding with preamble on P20 (no preamble on S20)
\*      110: 160 MHz channel bonding with preamble on P40
111: 160 MHz channel bonding with preamble on P20 (no preamble on S20)  }

100 and 101 indicate channel bonding information in primary 40 and primary 20 (i.e., secondary 20 is not included), respectively, in a BW of 80 MHz and 110 and 111 indicate channel bonding information in primary 40 and primary 20 (i.e., secondary 20 is not included), respectively, in a BW of 160 MHz.

In this case, detail null bandwidth information (or non-contiguous channel information) included in HE-SIG B (in particular, HE-SIG B common part) can be defined as examples described in the following.

A table 23 in the following illustrates an example of channel bonding information included in the HE-SIG B.

TABLE 23

\*      Channel bonding information (2 bits, b0b1) in HE-SIG B of 80 MHz (i.e., if a BW of the HE-SIG A corresponds to 100 and 101): b0 indicates a first 20 MHz channel of Secondary 40 and b1 indicates a second
20 MHz channel of Secondary 40. 0 indicates that the 20 MHz channel is not used.
\*      01: indicates that the first 20 MHz channel of Secondary 40 is not
used and the second 20 MHz channel of Secondary 40 is used only.
\*      10: indicates that the first 20 MHz channel of Secondary 40 is used and the second 20 MHz channel of Secondary 40 is not used.
\*      Channel bonding information (6 bits, b0b1b2b3b4b5) in HE-SIG B of 160 MHz (i.e., if a BW of the HE-SIG A corresponds to 110 and 111): b0 indicates a first 20 MHz channel of Secondary 40, b1 indicates a second 20 MHz channel of Secondary 40, b2 indicates a first 20 MHz channel of Secondary 80, b3 indicates a second 20 MHz channel of Secondary 80, b4 indicates a third 20 MHz channel of Secondary 80, and b5 indicates a fourth 20 MHz channel of Secondary 80. 0 indicates that the 20 MHz channel is not used and 1 indicates that the 20 MHz channel is used.
\*      011111: In Secondary 40 and Secondary 80, the first 20 MHz channel of Secondary 40 is not used only and the remaining channels are used.
\*      101111: In Secondary 40 and Secondary 80, the second 20 MHz channel of Secondary 40 is not used only and the remaining channels are used.
The remaining bitmaps are similarly applied.

In the example above, resource allocation information (user fields related to RU allocation field (8 bits)) on channels corresponding to the primary 20 (or primary 40) and channels corresponding to a bit set to 1 in the channel bonding information are additionally included in the HE-SIG B. For example, when a BW index of the HE SIG A corresponds to 100 and the channel bonding information of the HE-SIG B corresponds to 01, resource allocation (RU allocation) information on 242 units corresponding to a first channel and a fourth channel (e.g., second channels of primary 20 and primary 40) are included in the HE-SIG B of the CH1/CH4.

Using [1, 2, 1, 2] Structure of HE-SIG B

Figure 24:
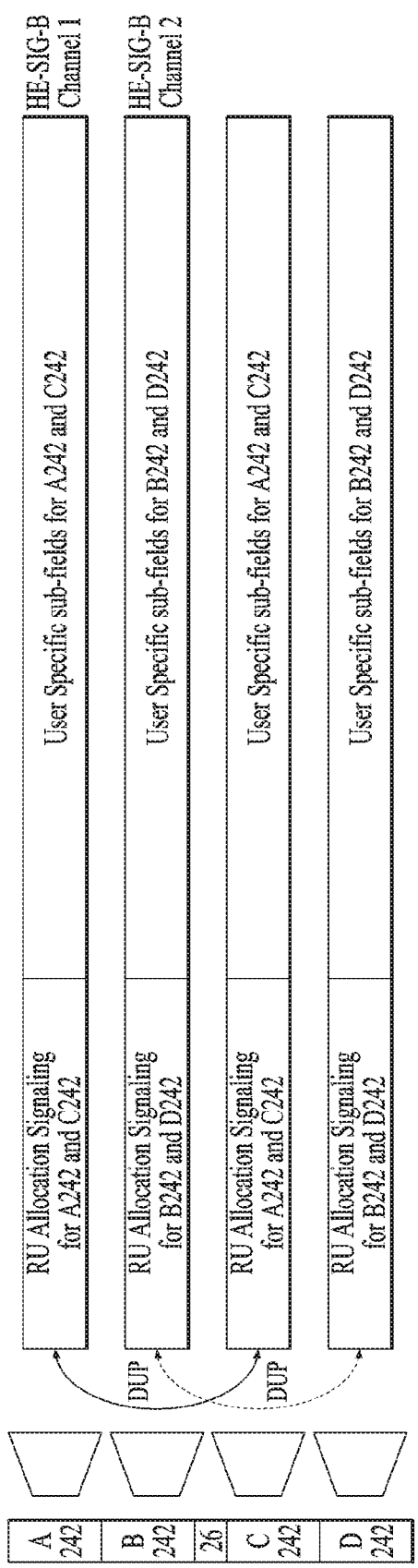
FIGS. 24 and 25 are diagrams for explaining a structure for transmitting HE-SIG B in a band equal to or wider than 80 MHz according to one embodiment of the present invention.
Figure 25:
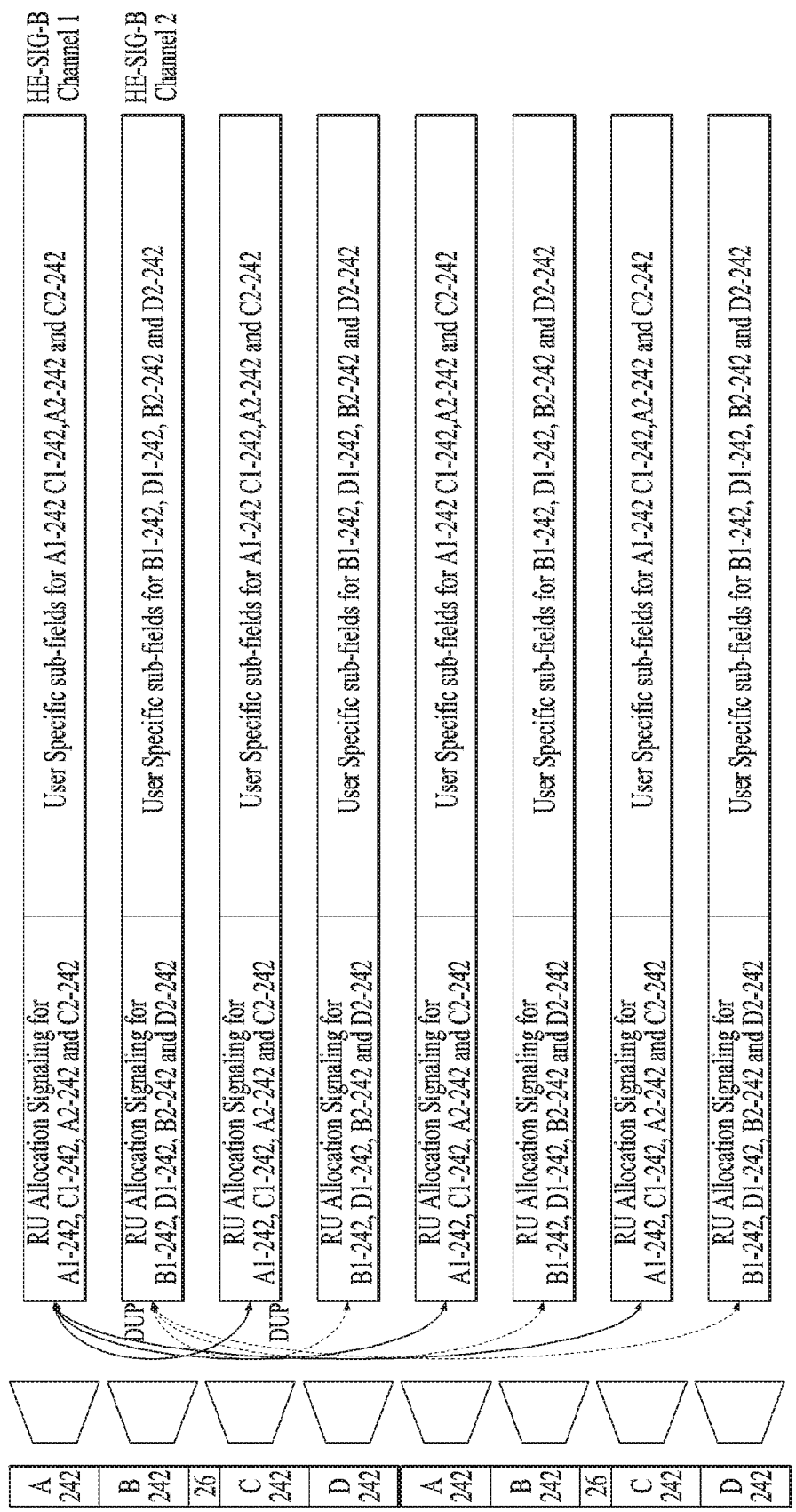

FIGS. 24 and 25 are diagrams for explaining a structure for transmitting HE-SIG B in a band equal to or wider than 80 MHz according to one embodiment of the present invention.

Specifically, when a radio frame is transmitted on 80 MHz band, FIG. 24 illustrates a case that resource regions A, B, C and D (in the following, the resource regions can also be represented as HE-SIG B CH 1, 2, 3, and 4) respectively corresponding to 20 MHz (242 tones) exist. If 4 channels corresponding to the resource regions exist, control information of the HE-SIG B may have a form that the same control information is repeatedly transmitted in CH 1 and CH 3 and a form that the same control information is repeatedly transmitted in CH 2 and CH 4. In particular, independent control information [1, 2] of two types may have a repeated structure in a form of [1, 2, 1, 2] in 4 channels.

In particular, as shown in FIG. 24, it is preferable that HE-SIG B of CH 1 includes not only resource allocation information on a resource region A but also resource allocation information on a resource region C. And, it is preferable that HE-SIG B of CH 2 includes not only resource allocation information on a resource region B but also resource allocation information on a resource region D.

Meanwhile, when a radio frame is transmitted on 160 MHz band, FIG. 25 illustrates a case that channel allocation information on resource regions A1, B1, C1, D1, A2, B2, C2, and D4 follows the type of repeating the [1, 2, 1, 2] structure. In particular, resource allocation information on the resource regions A1, C1, A2, and C2 are transmitted via CH 1 and the resource allocation information can be repeated on CH3, CH5, and CH 7. In the same manner, resource allocation information on the resource regions B1, D1 B2, and D2 are transmitted via CH 2 and the resource allocation information can be repeated on CH 4, CH 6, and CH 8.

If a BW field of the HE-SIG A indicates that a specific CH corresponds to a null channel under the abovementioned assumption, it may be able to indicate a location of the null channel via HE-SIG B which is transmitted via a channel which is not a null channel. For example, the BW field of the HE-SIG A can indicate that a BW corresponds to 80 MHz and a null channel of 20 MHz exists. In this case, if an actual null channel corresponds to CH 3, it is preferable not to transmit HE-SIG B via the CH 3. However, since CH 1 includes resource allocation information on the CH 3 due to the aforementioned [1, 2, 1, 2] structure and indicates that 242 tones corresponding to the CH 3 correspond to an empty resource region, it is able to indicate a specific location of a null channel.

In the abovementioned embodiment, resource allocation information (user fields related to RU allocation field (8 bits)) on channels of which null indication is set to 1 is additionally included in the HE-SIG B. For example, when a BW index of the HE-SIG A corresponds to 100 and channel bonding information of the HE-SIG B corresponds to 01, HE-SIG B of CH 1 includes an RU allocation field for 242 units corresponding to a first channel, a third channel, and a fourth channel (e.g., a first channel and a second channel of primary 20 and secondary 40), an RU allocation field for a CH 3 indicates that 242 units corresponding to the CH 3 correspond to null allocation, and a user field corresponding to 242 units of the CH 3 is not included. In the present example, among reserved values of the RU allocation field included in the HE-SIG B, a specific value indicates that 242 RUs corresponding to a certain channel are null and an STA is able to know that the 242 RUs are null via the specific value.

A table described in the following illustrates a different example of channel bonding information transmitted via HE-SIG B.

TABLE 24

| |
|---|
| * Channel bonding information bitmap (1 bit, b0) in HE-SIG B of 80 MHz (i.e., when a BW of HE-SIG A corresponds to 100 and 101): In HE-SIG B of CH 1 (Primary 20) and CH 3 (first 20 MHz of Secondary 40), corresponding information indicates whether or not CH 4 is used. In HE-SIG B of CH 2 (Secondary 20) and CH 4 (second 20 MHz of Secondary 40), corresponding information indicates whether or not CH 3 is used. Channel bonding information bitmap (3 bits, b0b1b2) in HE-SIG B of 160 MHz (i.e., when a BW of HE-SIG A corresponds to 110 and 111): In HE-SIG B of CH 1 (Primary 20), CH 3 (first 20 MHz of Secondary 40), CH 5 (first 20 MHz of Secondary 80), and CH 7 (third 20 MHz of Secondary 80), corresponding information indicates whether or not CH 4(b0), CH 6 (b1), and CH 8(b2) are used. In HE-SIG B of CH 2 (Secondary 20), CH 4 (second 20 MHz of Secondary 40), CH 6 (second 20 MHz of Secondary 80), and CH 8 (fourth 20 MHz of Secondary 80), corresponding information indicates whether or not CH 3 (b0), CH 5 (b1), and CH 7 (b2) are used. |

In the abovementioned bitmap, resource allocation information (user fields related to RU allocation field (8 bits)) on channels (242 RUs) corresponding to a bit set to 1 is additionally included in the HE-SIG B. For example, when a BW index of the HE-SIG A corresponds to 100 and channel bonding information of the HE-SIG B of the CH 1 corresponds to 1, RU allocation fields for the CH 1, the CH 3, and the CH 4 are transmitted in a manner of being included in a common part of the HE-SIG B of the CH 1.

When a BW index of the HE-SIG A corresponds to 101 and channel bonding information of the HE-SIG B of the CH 1 corresponds to 1, RU allocation fields for the CH 1, the CH 3, and the CH 4 are transmitted in a manner of being included in a common part of the HE-SIG B of the CH 1. If channel bonding information of the HE-SIG B of the CH 2 corresponds to 0, RU allocation fields for the CH 2 and the CH 4 are transmitted in a manner of being included in a common part of the HE-SIG B of the CH 2. In this case, an RU allocation field for the CH 3 included in the HE-SIG B of the CH 1 indicates that RUs of 242 tones corresponding to the CH 3 are null. In the present example, among reserved value of the RU allocation field, a specific value indicates that 242 RUs corresponding to a certain channel are null and an STA is able to know that the 242 RUs are null via the specific value.

Figure 26:
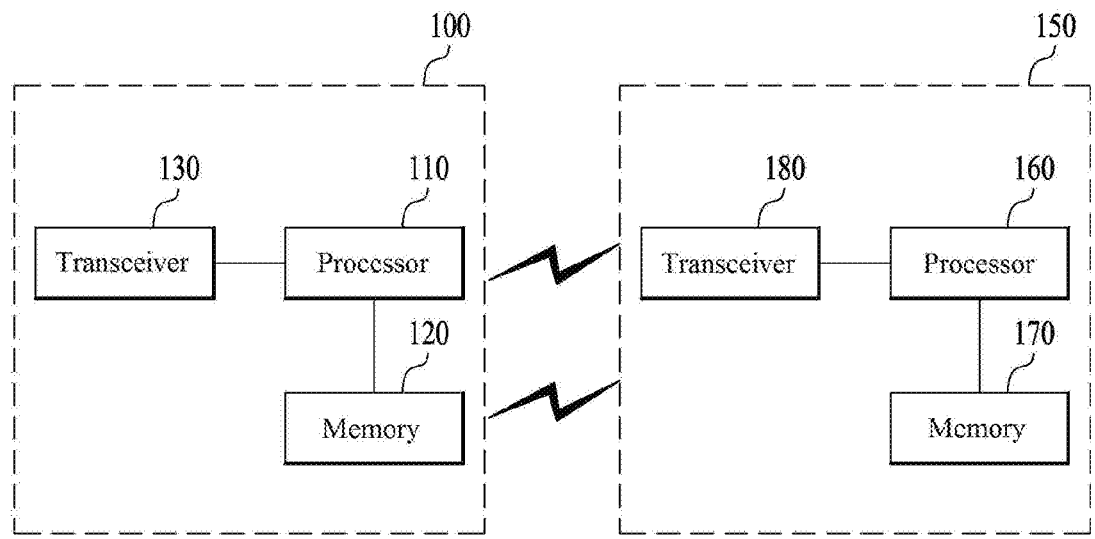
FIG. 26 is a block diagram illustrating exemplary configurations of an Access Point (AP) (or Base Station (BS)) and a Station (STA) (or User Equipment (UE)).

FIG. 26 is a block diagram illustrating an exemplary configuration of an AP (or a BS) and an STA (or a terminal) according to an embodiment of the present invention.

The AP 100 may include a processor 110, a memory 120, and a transceiver 130. The STA 150 may include a processor 160, a memory 170, and a transceiver 180.

The transceivers 130 and 180 may transmit/receive radio signals and may implement a physical layer according to, for example, an IEEE 802 system. The processors 110 and 160 may be connected to the transceivers 130 and 180 to implement a physical layer and/or a MAC layer according to the IEEE 802 system. The processors 110 and 160 may be configured to perform operations in accordance with one or more combinations of the various embodiments of the invention described above. In addition, modules implementing the operations of the AP and the STA according to the various embodiments of the present invention described above may be stored in the memories 120 and 170 and executed by the processors 110 and 160. The memories 120 and 170 may be included in the processors 110 and 160 or may be installed outside the processors 110 and 160 and connected to the processors 110 and 160 by known means.

The above description of the AP 100 and the STA 150 may be applied to a BS and a terminal in other wireless communication systems (e.g., LTE/LTE-A system), respectively.

The specific configuration of the AP and the STA may be implemented such that the above-described embodiments of the present invention are applied independently or two or more of the embodiments are applied at the same time. For the sake of clarity, redundant description will be omitted.

Figure 27:
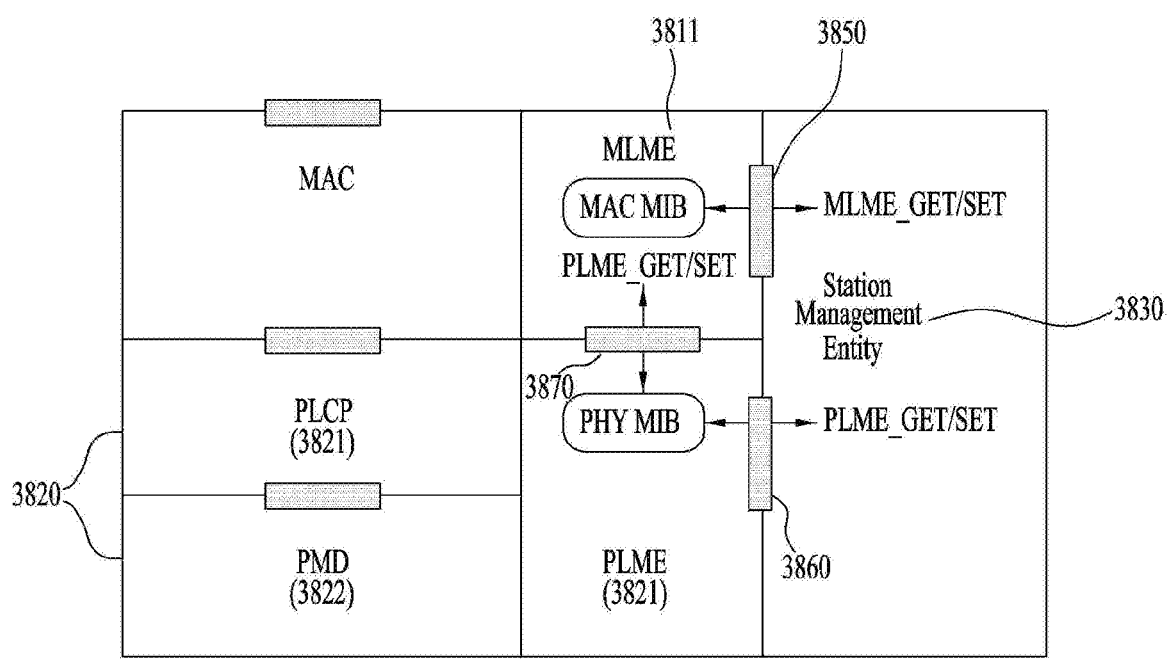
FIG. 27 is a view illustrating an exemplary structure of a processor in an AP or an STA.

FIG. 27 illustrates an exemplary structure of a processor of an AP or an STA according to an embodiment of the present invention.

The processor of the AP or STA may have a plurality of layers, and FIG. 27 specifically illustrates a MAC sublayer 3810 and a physical layer 3820 on a data link layer (DLL) among these layers. As shown in FIG. 27, the PHY 3820 may include a Physical Layer Convergence Procedure (PLCP) entity 3821 and a Physical Medium Dependent (PMD) entity 3822. The MAC sublayer 3810 and the PHY 3820 both conceptually include a management entity called an MLME (MAC Sublayer Management Entity) 3811. These entities 3811 and 3821 provide a layer management service interface in which the layer management function operates.

In order to provide correct MAC operation, an STA Management Entity (SME) 3830 exists in each STA. The SME 3830 is a layer-independent entity that may be present in a separate management plane or may appear to be off to the side. Although the exact functions of the SME 3830 are not specifically described in this document, the entity 3830 may generally appear to serve to collect layer-dependent states from various Layer Management Entities (LMEs) and set layer-specific parameter values similarly. The SME 3830 may typically perform these functions on behalf of the typical system management entity and implement a standard management protocol.

The entities shown in FIG. 27 interact in various ways. FIG. 27 shows some examples of exchanging GET/SET primitives. The XX-GET.request primitive is used to request the value of a given MIB attribute (management information based attribute). The XX-GET.confirm primitive returns an appropriate value of the MIB attribute information if the Status is "Success". Otherwise, it is used to return an error indication in the Status field. The XX-SET.request primitive is used to request that the indicated MIB attribute be set to a given value. If the MIB attribute indicates a specific operation, it is requested that the corresponding operation be performed. The XX-SET.confirm primitive confirms that the indicated MIB attribute is set to a requested value if the status is "Success". Otherwise, it is used to return an error condition to the status field. If the MIB attribute indicates a specific operation, this confirms that the operation has been performed.

As shown in FIG. 27, the MLME 3811 and SME 3830 may exchange various MLME_GET/SET primitives through MLME_SAP 3850. In addition, various PLCM_GET/SET primitives may be exchanged between the PLME 3821 and the SME 3830 via the PLME_SAP 3860 and may be exchanged between the MLME 3811 and the PLME 3870 via the MLME-PLME_SAP 3870.

The embodiments of the present invention described above may be implemented through various means. For example, the embodiments of the present invention may be implemented by hardware, firmware, software, or a combination thereof.

When implemented by hardware, a method according to embodiments of the present invention may be embodied as one or more application specific integrated circuits (ASICs), one or more digital signal processors (DSPs), one or more digital signal processing devices (DSPDs), one or more programmable logic devices (PLDs), one or more field programmable gate arrays (FPGAs), a processor, a controller, a microcontroller, a microprocessor, etc.

When implemented by firmware or software, a method according to embodiments of the present invention may be embodied as a module, a procedure, or a function that performs the functions or operations described above. Software code may be stored in a memory unit and executed by a processor. The memory unit is located at the interior or exterior of the processor and may transmit and receive data to and from the processor via various known means.

Preferred embodiments of the present invention have been described in detail above to allow those skilled in the art to implement and practice the present invention. Although the preferred embodiments of the present invention have been described above, those skilled in the art will appreciate that various modifications and variations can be made in the present invention without departing from the spirit or scope of the invention. Thus, the present invention is not intended to be limited to the embodiments described herein, but is intended to have the widest scope consistent with the principles and novel features disclosed herein. While the present invention has been particularly shown and described with reference to preferred embodiments thereof, it will be apparent to those skilled in the art that various modifications and variations can be made in the present invention without departing from the spirit or scope of the invention. Such modifications are not to be construed individually from the spirit and scope of the present disclosure.

INDUSTRIAL APPLICABILITY

In this specification, both an article invention and a method invention are explained, and the description of the two inventions may be supplemented as necessary.

What is claimed is:

1. A method of transmitting a signal, which is transmitted by an STA (station) operating in a wireless LAN (WLAN) system using a multi user (MU) scheme, comprising the steps of:

configuring a radio frame in which a signaling (SIG) field containing control information and a data field for transmitting data are contained, wherein the signaling field is configured to contain an SIG A field containing bandwidth information indicating the whole bandwidth having a bandwidth wider than 20 MHz as much as $2^n$ times and an SIG B field containing user specific information; and transmitting the radio frame to one or more other STAs, wherein the bandwidth information of the SIG A field additionally indicates whether or not the whole bandwidth contains one or more 20 MHz bands (null channel) not used for transmitting data.

2. The method of claim 1, wherein the SIG B field additionally contains information indicating a location of the null channel.

3. The method of claim 2, wherein the SIG B field contains a common part containing common control information and a user specific part containing the user specific information and wherein the information indicating the location of the null channel is contained in the common part.

4. The method of claim 1, wherein the bandwidth information of the SIG A field has a form of a bit sequence of a prescribed length, wherein first region values of the bit sequence indicate that the whole bandwidth having a bandwidth wider than 20 MHz as much as $2^n$ times is used for transmitting data without the null channel, and wherein second region values of the bit sequence indicate that the whole bandwidth having the bandwidth wider than 20 MHz as much as $2^n$ times contains the one or more null channels.

5. The method of claim 4, wherein the first region values of the bit sequence contain 1, 2, 3, and 4 and wherein 1, 2, 3, and 4 of the bit sequence indicate 20 MHz, 40 MHz, 80 MHz, and 160 MHz, respectively.

6. The method of claim 1, wherein if the radio frame is transmitted on a bandwidth of 80 MHz, the SIG B field is transmitted via first to fourth channels each of which corresponds to a band of 20 MHz and wherein SIG B field control information, which is transmitted via the first channel and the second channel, makes a pair with the third channel and the fourth channel and is repeatedly transmitted via each of the pairs.

7. The method of claim 6, wherein if the bandwidth information of the SIG A field indicates that the null channel is contained in the whole bandwidth of 80 MHz, SIG B field control information, which is transmitted via a channel rather than the null channel among two channels making a pair, indicates a location of the null channel.

8. The method of claim 6, wherein information indicating the location of the null channel among the SIG B field control information indicates that 242 tones corresponding to a specific channel correspond to an empty resource region.

9. The method of claim 1, wherein if the radio frame is transmitted on a bandwidth of 160 MHz, the SIG B field is transmitted via first to eighth channels each of which corresponds to a band of 20 MHz, wherein SIG B field control information, which is transmitted via the first channel, makes a first pair with the third channel, the fifth channel, and the seventh channel and is repeatedly transmitted via each of the channels, and wherein SIG B field control information, which is transmitted via the second channel, makes a second pair with the fourth channel, the sixth channel, and the eighth channel and is repeatedly transmitted via each of the channels.

10. The method of claim 9, wherein if the bandwidth information of the SIG A field indicates that the null channel is contained in the whole bandwidth of 160 MHz, SIG B field control information, which is transmitted via a channel rather than the null channel of a pair containing the null channel among the first pair and the second pair, indicates a location of the null channel.

11. The method of claim 10, wherein information indicating the location of the null channel among the SIG B field control information indicates that 242 tones corresponding to a specific channel correspond to an empty resource region.

12. The method of claim 1, wherein if the whole bandwidth is equal to or wider than 80 MHz, the whole bandwidth contains a primary 20 MHz channel, a secondary 20 MHz channel, and a secondary 40 MHz channel and wherein the primary 20 MHz channel is not configured as the null channel.

13. A method of receiving a signal, which is received by an STA (station) operating in a wireless LAN (WLAN) system using a multi user (MU) scheme, comprising the steps of:
receiving a radio frame in which a signaling (SIG) field containing control information and a data field for transmitting data are contained; and
processing the received radio frame,
wherein the signaling field contains an SIG A field containing bandwidth information indicating the whole bandwidth having a bandwidth wider than 20 MHz as much as $2^n$ times and an SIG B field containing user specific information and wherein the bandwidth information of the SIG A field checks whether or not the whole bandwidth contains one or more 20 MHz bands (null channel) not used for transmitting data.

14. An STA (station) capable of operating in a wireless LAN (WLAN) system using a multi user (MU) scheme, comprising:
a processor configured to configure a radio frame in which a signaling (SIG) field containing control information and a data field for transmitting data are contained, wherein the signaling field is configured to contain an SIG A field containing bandwidth information indicating the whole bandwidth having a bandwidth wider than 20 MHz as much as $2^n$ times and an SIG B field containing user specific information; and
a transceiver configured to receive a radio frame from the processor and transmit the radio frame to one or more other STAs,
wherein the processor is configured to make the bandwidth information of the SIG A field additionally indicate whether or not the whole bandwidth contains one or more 20 MHz bands (null channel) not used for transmitting data.

15. An STA (station) capable of operating in a wireless LAN (WLAN) system using a multi user (MU) scheme, comprising:
a transceiver configured to receive a radio frame in which a signaling (SIG) field containing control information and a data field for transmitting data are contained; and
a processor configured to process the radio frame received by the transceiver,
wherein the signaling field contains an SIG A field containing bandwidth information indicating the whole bandwidth having a bandwidth wider than 20 MHz as much as $2^n$ times and an SIG B field containing user specific information and wherein the processor is configured to check whether or not the whole bandwidth contains one or more 20 MHz bands (null channel) not used for transmitting data via the bandwidth information of the SIG A field.

* * * * *